(12) United States Patent
Hirata et al.

(10) Patent No.: US 8,559,133 B2
(45) Date of Patent: Oct. 15, 2013

(54) PERPENDICULAR MAGNETIC WRITE HEAD AND MAGNETIC WRITE DEVICE

(75) Inventors: Kei Hirata, Tokyo (JP); Takeo Kagami, Tokyo (JP); Tatsuhiro Nojima, Tokyo (JP); Hisayoshi Watanabe, Tokyo (JP); Michitaka Nishiyama, Tokyo (JP)

(73) Assignee: TDK Corporation, Tokyo (JP)

( * ) Notice: Subject to any disclaimer, the term of this patent is extended or adjusted under 35 U.S.C. 154(b) by 1094 days.

(21) Appl. No.: 12/457,089

(22) Filed: Jun. 1, 2009

(65) Prior Publication Data

US 2010/0302680 A1  Dec. 2, 2010

(51) Int. Cl.
*G11B 5/127* (2006.01)

(52) U.S. Cl.
USPC .............. 360/125.3; 360/119.02; 360/119.04; 360/128

(58) Field of Classification Search
None
See application file for complete search history.

(56) References Cited

U.S. PATENT DOCUMENTS

| | | | |
|---|---|---|---|
| 6,954,340 B2 | 10/2005 | Shukh et al. | |
| 2006/0221497 A1* | 10/2006 | Okada et al. | 360/125 |
| 2007/0177301 A1* | 8/2007 | Han et al. | 360/126 |
| 2007/0217069 A1* | 9/2007 | Okada et al. | 360/126 |
| 2007/0253107 A1* | 11/2007 | Mochizuki et al. | 360/126 |
| 2008/0112082 A1* | 5/2008 | Guan et al. | 360/128 |

FOREIGN PATENT DOCUMENTS

| | | |
|---|---|---|
| JP | A-6-119632 | 4/1994 |
| JP | A-2001-331920 | 11/2001 |
| JP | A-2004-22004 | 1/2004 |
| JP | A-2004-326990 | 11/2004 |
| JP | A-2005-190518 | 7/2005 |
| JP | A-2005-310363 | 11/2005 |
| JP | A-2007-250074 | 9/2007 |
| JP | A-2007-257711 | 10/2007 |
| JP | A-2007-294059 | 11/2007 |
| JP | A-2008-186555 | 8/2008 |

\* cited by examiner

*Primary Examiner* — Holly Rickman
*Assistant Examiner* — Lisa Chau
(74) *Attorney, Agent, or Firm* — Oliff & Berridge, PLC

(57) ABSTRACT

A perpendicular magnetic write head includes: a magnetic pole having an end face on an air bearing surface; and side shield layers each having an end face on the air bearing surface, and arranged on both sides, in a write track width direction, of the magnetic pole with a side gap in between. The end face of the magnetic pole has a geometry in which a width at a trailing edge is larger than a width at a leading edge. Relationship D1<D2, D1<D3, and D3≥D2 are satisfied in the air bearing surface, where D1 is a gap length of the side gap at the trailing edge, D2 is a gap length of the side gap at the leading edge, and D3 is a gap length of the side gap at any position between the trailing edge and the leading edge.

17 Claims, 17 Drawing Sheets

PERPENDICULAR MAGNETIC WRITE HEAD AND MAGNETIC WRITE DEVICE

BACKGROUND OF THE INVENTION

1. Field of the Invention

The present invention relates to a perpendicular magnetic write head provided with a magnetic pole and a side shield layer, and a magnetic write device mounted with the same.

2. Description of the Related Art

In recent years, with improvement in the areal recording density of a magnetic recording medium (hereafter, referred to as "recording medium") which is typified by a hard disk, performance improvement in a magnetic write head is desired. In response to such a trend, as a writing method of the magnetic write head, in substitution for the longitudinal magnetic writing method in which the direction of a signal magnetic field is set to the in-plane direction of the recording medium, the perpendicular magnetic writing method in which the direction of the signal magnetic field is set to the direction intersecting the plane of the recording medium has attracted attention. This is because, there are such advantages that the linear recording density improves, and a recording medium on which information has been already recorded is less subjected to heat fluctuation.

A magnetic write head of the perpendicular magnetic writing method (hereafter, referred to as "perpendicular magnetic write head") is provided with a thin film coil for generating magnetic flux, and a main magnetic pole layer leading the magnetic flux which is generated in the thin film coil, to a recording medium. This main magnetic pole layer includes a tip portion (magnetic pole) having a fine width, which generates a magnetic field (perpendicular magnetic field) for writing.

In order to deal with the high recording density while suppressing spread of the perpendicular magnetic field, for a configuration of the perpendicular magnetic write head, the configuration in which a side shield layer is arranged on both sides of a magnetic pole with a gap in between, in a write track width direction has been taken into consideration (for example, see Japanese Unexamined Patent Publication Nos. 2004-326990, 2004-022004, and 2005-310363).

Under this situation, since there is such a tendency that the areal recording density of a recording medium increases more and more today, it is highly desired to make the configuration of the perpendicular magnetic write head more suitable. However, in the perpendicular magnetic write head of the related art, which includes the side shield layer, the relationship between ensuring magnitude of the perpendicular magnetic field and suppression of spread of the perpendicular magnetic field is a trade-off. Thus, it is difficult to realize both ensuring magnitude of the perpendicular magnetic field and suppression of spread of the perpendicular magnetic field. This means that there is still room for improvement in the writing performance.

For these reasons, it is highly desired to improve the writing performance by realizing both ensuring magnitude of the perpendicular magnetic field and suppression of spread of the perpendicular magnetic field.

SUMMARY OF THE INVENTION

A perpendicular magnetic write head of the present invention includes: a magnetic pole having an end face on an air bearing surface; and side shield layers each having an end face on the air bearing surface, and arranged on both sides, in a write track width direction, of the magnetic pole with a side gap in between. The end face of the magnetic pole has a geometry in which a width at a trailing edge is larger than a width at a leading edge. Relationship $D1<D2$, $D1<D3$, and $D3 \geq D2$ are satisfied in the air bearing surface, where $D1$ is a gap length of the side gap at the trailing edge, $D2$ is a gap length of the side gap at the leading edge, and $D3$ is a gap length of the side gap at any position between the trailing edge and the leading edge.

Another perpendicular magnetic write head of the present invention includes: a magnetic pole having an end face on an air bearing surface; and a write shield layer having an end face on the air bearing surface, and surrounding the magnetic pole with a gap in between, on three sides, that is both sides in a write track width direction and a trailing side. The end face of the magnetic pole has a geometry which a width at a trailing edge is larger than a width at a leading edge. Relationship $D1<D2$, $D1<D3$, and $D3 \geq D2$ are satisfied in the air bearing surface, where $D1$ is a gap length of the side gap at the trailing edge, $D2$ is a gap length of the side gap at the leading edge, and $D3$ is a gap length of the side gap at any position between the trailing edge and the leading edge.

Yet another perpendicular magnetic write head of the present invention includes: a magnetic pole having an end face on an air bearing surface; and a shield layer having an end face on the air bearing surface, and surrounding the magnetic pole with a gap in between, on all sides, that is both sides in a write track width direction, a trailing side, and a leading side. The end face of the magnetic pole has a geometry which a width at a trailing edge is larger than a width at a leading edge. Relationship $D1<D2$, $D1<D3$, and $D3 \geq D2$ are satisfied in the air bearing surface, where $D1$ is a gap length of the side gap at the trailing edge, $D2$ is a gap length of the side gap at the leading edge, and $D3$ is a gap length of the side gap at any position between the trailing edge and the leading edge.

The magnetic write device of the present invention includes a recording medium, and the perpendicular magnetic write head described above.

According to the perpendicular magnetic write head or the magnetic write device of the present invention, the side shield layers each having the end face on the air bearing surface, and arranged on both sides, in the write track width direction, of the magnetic pole with the side gap in between are provided. The end face of the magnetic pole has the geometry in which the width at the trailing edge is larger than the width at the leading edge. Relationship $D1<D2$, $D1<D3$, and $D3 \geq D2$ are satisfied in the air bearing surface, where $D1$ is the gap length of the side gap at the trailing edge, $D2$ is the gap length of the side gap at the leading edge, and $D3$ is the gap length of the side gap at any position between the trailing edge and the leading edge. In this case, in the side shield layer, the portion in the vicinity of the trailing edge is locally close to the magnetic pole, and the portion in the vicinity of the leading edge and the portion between the trailing edge and the leading edge are away from the magnetic pole. Thereby, in the side shield layer, the spread component of the magnetic flux is easily absorbed in the portion in the vicinity of the trailing edge, and the magnetic flux becomes less likely to be excessively absorbed in the portion except for the portion in the vicinity of the trailing edge. Therefore, both ensuring magnitude of the perpendicular magnetic field and suppression of spread of the perpendicular magnetic field are realized, and it is possible to improve the writing performance.

In another perpendicular magnetic write head according to the embodiment of the present invention, the write shield layer having the end face on the air bearing surface, and arranged on both sides, in the write track width direction, and the trailing side, of the magnetic pole with the gap in between are provided. The end face of the magnetic pole has the geometry in which the width at the trailing edge is larger than the width at the leading edge. Alternatively, the shield layer having the end face on the air bearing surface, and arranged on both sides in the track width direction, the trailing side, and the leading side, of the magnetic pole with the gap in between is provided. The end face of the magnetic pole has the geometry in which the width at the trailing edge is larger than the width at the leading edge. Relationship D1<D2, D1<D3, and D3≥D2 are satisfied in the air bearing surface, where D1 is the gap length of the side gap at the trailing edge, D2 is the gap length of the side gap at the leading edge, and D3 is the gap length of the side gap at any position between the trailing edge and the leading edge. In this case, as in the perpendicular magnetic write head or the magnetic write device of the present invention described above, in the write shield layer, the portion in the vicinity of the trailing edge is locally close to the magnetic pole, and the portion except for the vicinity of the trailing edge is away from the magnetic pole. Thereby, in the write shield layer and the like, the spread component of the magnetic flux is easily absorbed in the portion in the vicinity of the trailing edge, and the magnetic flux becomes less likely to be excessively absorbed in the portion except for the portion in the vicinity of the trailing edge. Therefore, both ensuring magnitude of the perpendicular magnetic field and suppression of spread of the perpendicular magnetic field are realized, and it is possible to improve the writing performance.

DETAILED DESCRIPTION OF THE PREFERRED EMBODIMENT

An embodiment of the present invention will be described in detail with reference to the accompanying drawings.
[Configuration of Thin Film Magnetic Head Including Perpendicular Magnetic Write Head]

Figure 1:
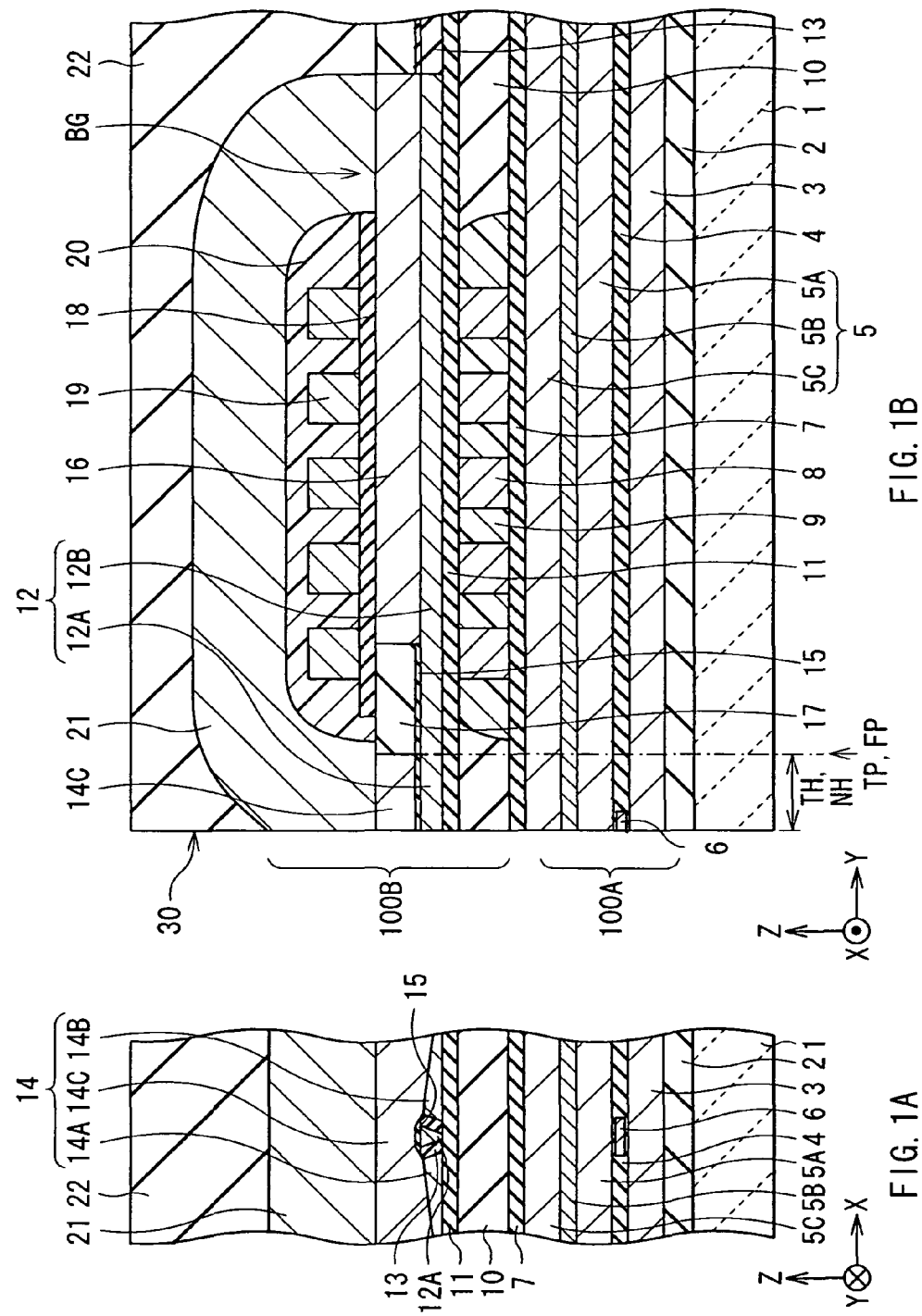
FIG. 1 is a cross-sectional view illustrating the configuration of a thin film magnetic head which includes a perpendicular magnetic write head according to an embodiment of the present invention.
Figure 2:
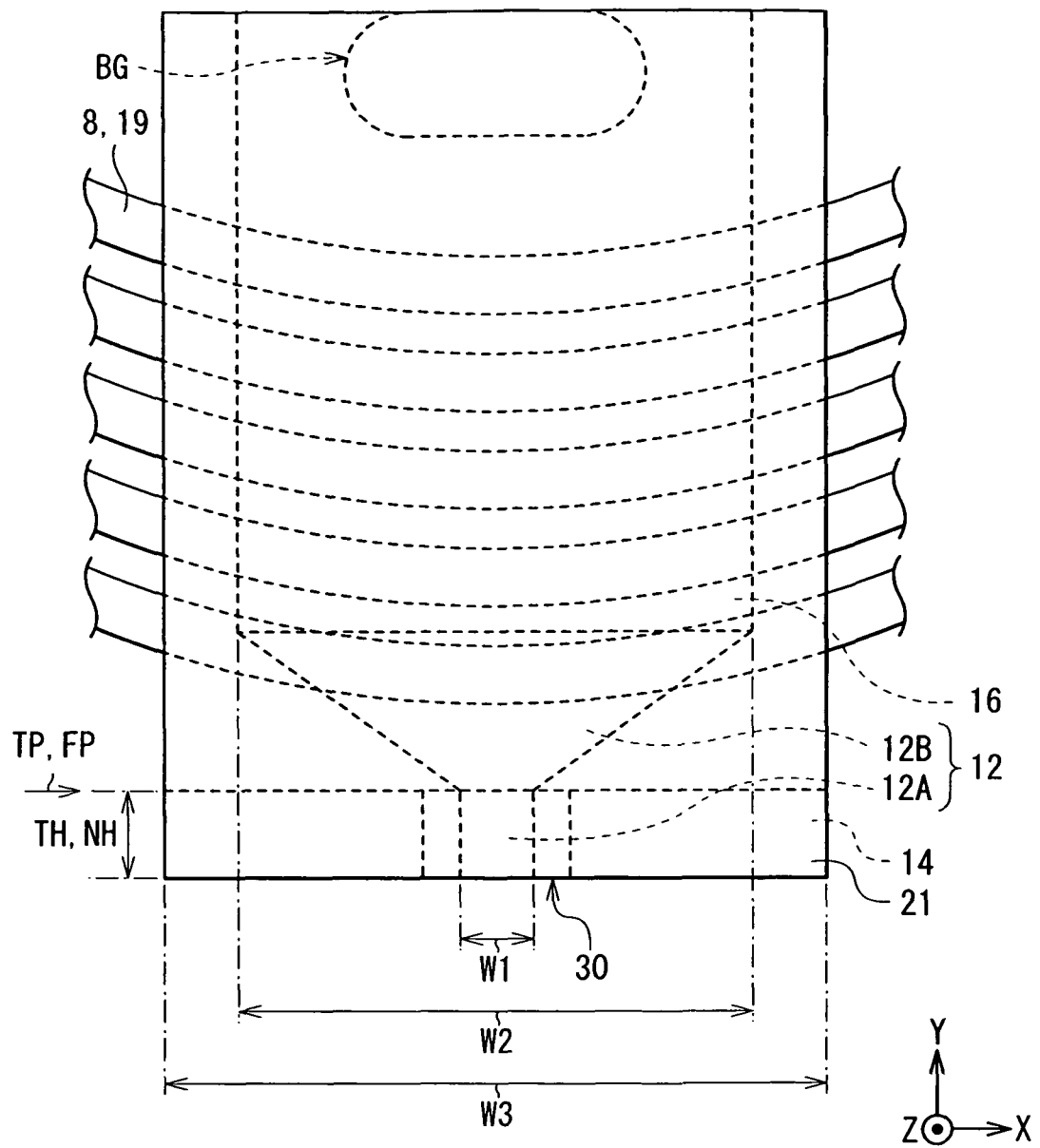
FIG. 2 is a plan view illustrating the configuration of a main part of the thin film magnetic head.
Figure 3:
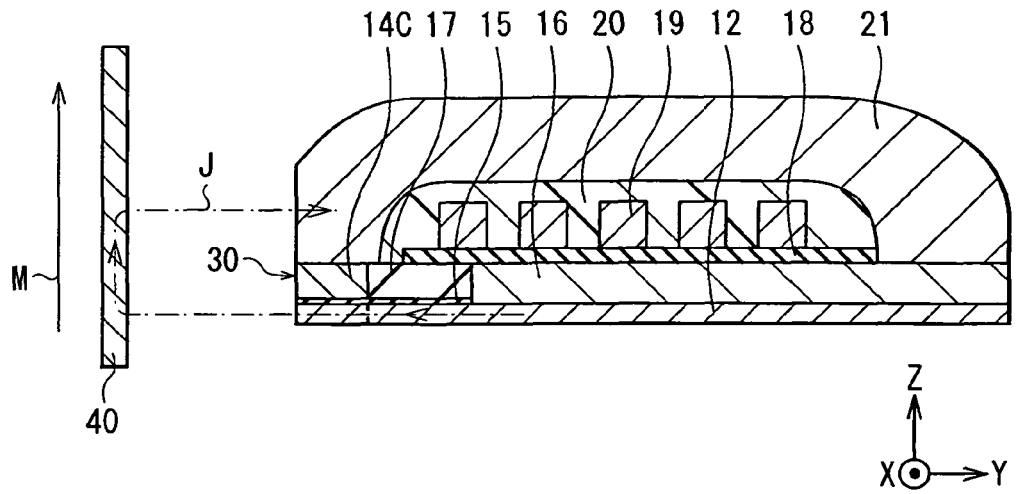
FIG. 3 is a cross-sectional view for explaining a relationship between the thin film magnetic head and a recording medium.

FIGS. 1 to 3 illustrate the configuration of a thin film magnetic head including a perpendicular magnetic write head. FIG. 1 indicates the overall cross-sectional configuration, and FIG. 2 indicates the plan configuration of a main part, respectively. FIG. 3 explains a relationship between the thin film magnetic head and a recording medium 40. In FIG. 1, (A) indicates a cross-section which is parallel to an air bearing surface 30, and (B) indicates a cross-section which is perpendicular to the air bearing surface 30, respectively. Upward arrow M in FIG. 3 indicates the direction where the recording medium 40 is shifted relatively to the thin film magnetic head.

In the description below, the dimensions in the x-axis direction, the y-axis direction, and the z-axis direction, indicated in FIGS. 1 to 3, are referred to as "width", "length", and "thickness", respectively. The side close to the air bearing surface 30 in the y-axis direction is referred to as "front", and the side away from the air bearing surface 30 in the y-axis direction is referred to as "rear", respectively. Moreover, the forward side in the direction of arrow M is referred to as "trailing side", and the rearward side in the direction of arrow M is referred to as "leading side", respectively. These definitions are similar in FIG. 4 and the figures subsequent to FIG. 4.

The thin film magnetic head described here performs a magnetic process to the recording medium 40 such as hard disk, and is, for example, a composite head capable of performing both a reading process and a writing process.

As indicated in FIG. 1, the thin film magnetic head has, for example, the configuration in which an insulating layer 2, a read head portion 100A, a separating layer 7, a write head portion 100B, and an overcoat layer 22 are stacked in this order on a substrate 1. The thin film magnetic head has the air bearing surface 30, which is one side face common to the insulating layer 2, the read head portion 100A, the separating layer 7, the write head portion 100B, the overcoat layer 22, and the substrate 1.

The substrate 1 is made of, for example, a ceramic material such as altic ($Al_2O_3.TiC$). The insulating layer 2, the separating layer 7, and the overcoat layer 22 are made of, for example, a nonmagnetic insulating material such as aluminum oxide. As the aluminum oxide, for example, there is alumina ($Al_2O_3$).

The read head portion 100A performs the reading process by utilizing magnetoresistive effect (MR: magneto-resistive effect). The read head portion 100A has, for example, the configuration in which a bottom lead shield layer 3, a shielding gap layer 4, and a top lead shield layer 5 are stacked in this order. In the shielding gap layer 4, a read element (MR element 6) is buried so that an end face of the MR element 6 is exposed to the air bearing surface 30.

The bottom lead shield layer 3 and the top lead shield layer 5 magnetically separate the MR element 6 from the periphery of the MR element 6, and extend rearward from the air bearing surface 30. The bottom lead shield layer 3 is made of, for example, a magnetic material such as an alloy of nickel and iron (NiFe). As the alloy of nickel and iron, for example, there is permalloy (tradename) in which content of nickel is 80 weight %, and content of iron is 20 weight %, respectively. The top lead shield layer 5 has the configuration in which magnetic layers 5A and 5C are stacked with a nonmagnetic layer 5B in between. The magnetic layers 5A and 5C are made of, for example, magnetic material such as permalloy. The nonmagnetic layer 5B is made of, for example, nonmagnetic conductive material such as ruthenium (Ru), or nonmagnetic insulating material such as alumina. It is not always necessary that the top lead shield layer 5 have a multi-layer structure. The top lead shield layer 5 may have a single-layer structure of magnetic material.

The shielding gap layer 4 electrically separates the MR element 6 from the periphery of the MR element 6, and is made of, for example, nonmagnetic insulating material such as alumina. The MR element 6 uses giant magnetoresistive effect (GMR: giant magneto-resistive effect), tunneling magnetoresistive effect (TMR: tunneling magneto-resistive effect), or the like.

The write head portion 100B is a perpendicular magnetic write head performing the writing process of the perpendicular magnetic writing method. The write head portion 100B has, for example, the configuration in which a thin film coil 8 buried with insulating layers 9 to 11, a main magnetic pole layer 12 and a side gap layer 13, a write shield layer 14, a trailing gap layer 15, an auxiliary magnetic pole layer 16 and an insulating layer 17, a thin film coil 19 buried with insulating layers 18 and 20, and a return yoke layer 21 are stacked in this order.

The thin film coil 8 mainly generates magnetic flux for suppressing leakage, so as to suppress that magnetic flux for writing, which is generated in the thin film coil 19, unintentionally reaches (leaks to) the read head portion 100A. The thin film coil 8 is made of, for example, high conductive material such as copper (Cu), and has such a winding structure (spiral structure) that the thin film coil 8 winds about a back gap BG, as indicated in FIGS. 1 and 2. The number of winds (number of turns) of the thin film coil 8 is not specifically limited. However, it is preferable that the number of winds of the thin film coil 8 be coincident with the number of turns of the thin film coil 19.

The insulating layers 9 to 11 electrically separate the thin film coil 8 from the periphery of the thin film coil 8. The insulating layer 9 is made of, for example, nonmagnetic insulating material such as photoresist or spin on glass (SOG: Spin On Glass), which flow by being heated. The insulating layers 10 and 11 are made of, for example, nonmagnetic insulating material such as alumina.

The main magnetic pole layer 12 accommodates the magnetic flux generated in the thin film coil 19, and generates a perpendicular magnetic field by releasing that magnetic flux from the air bearing surface 30. The main magnetic pole layer 12 extends rearward from the air bearing surface 30, and is made of, for example, high-saturation magnetic flux density magnetic material such as an iron-based alloy. As the iron-based alloy, for example, there is an alloy of iron and cobalt (FeCo), or an alloy of iron, cobalt, and nickel (FeCoNi).

In particular, for example, as indicated in FIG. 2, the main magnetic pole layer 12 substantially has the plan configuration of a battledore-like shape. In this case, the main magnetic pole layer 12 includes a tip portion 12A and a rear end portion 12B in this order from the air bearing surface 30, in which the tip portion 12A has a uniform width W1 which defines a write track width, and the rear end portion 12B has a width W2 which is larger than the width W1. The tip portion 12A is a portion (magnetic pole) substantially generating the perpendicular-magnetic field. The width of the rear end portion 12B gradually increases, for example, from the width W1 to the width W2 in the front, and is uniform (width W2) in the rear. The position where the width of the main magnetic pole layer 12 begins to increase from the width W1 is a so-called flare point FP.

The side gap layer 13 is a side gap SG magnetically separating the main magnetic pole layer 12 and the write shield layer 14 in the width direction (write track width direction=x-axis direction) (refer to FIG. 4 which will be described later). The side gap layer 13 is arranged between the main magnetic pole layer 12 and the write shield layer 14, and is adjacent to the main magnetic pole layer 12 on both sides of the width direction (hereafter, simply referred to as "both sides"). The thickness of the side gap layer 13 (gap length of the side gap SG) is, for example, 0.04 μm to 0.15 μm.

The trailing gap layer 15 is a trailing gap (write gap) magnetically separating the main magnetic pole layer 12 and the write shield layer 14 in the thickness direction (direction intersecting the write track width direction=y-axis direction). The trailing gap layer 15 is arranged between the main magnetic pole layer 12 and the write shield layer 14, and is adjacent to the main magnetic pole layer 12 on the trailing side.

The side gap layer 13 and the trailing gap layer 15 are made of, for example, nonmagnetic insulating material such as alumina.

The write shield layer 14 mainly absorbs the magnetic flux in the vicinity of the air bearing surface 30, and avoids spread of the magnetic flux. Thereby, the gradient of the perpendicular magnetic field increases, and the write track width is reduced. Thus, the magnetic field component in the oblique direction is contained in the perpendicular magnetic field. The write shield layer 14 extends rearward from the air bearing surface 30, and ends at, for example, the flare point FP. Thereby, the write shield layer 14 is adjacent to the insulating layer 17 in the rear, and has a function to define the forefront end position (throat height zero position TP) of the insulating layer 17. The write shield layer 14 is made of, for example, magnetic material which is similar to that of the main magnetic pole layer 12, and has the plan configuration of a rectangular shape with a uniform width W3 which is larger than the width W2, as indicated in FIG. 2. However, the write shield layer 14 may be made of magnetic material different from that of the main magnetic pole layer 12. The detailed configuration of the write shield layer 14 will be described later (refer to FIG. 4).

The auxiliary magnetic pole layer 16 serves as an auxiliary accommodation section of the magnetic flux, to supply the magnetic flux to the main magnetic pole layer 12. The auxiliary magnetic pole layer 16 may be made of, for example, magnetic material which is similar to that of the main magnetic pole layer 12, or magnetic material which is different from that of the main magnetic pole layer 12. The auxiliary magnetic pole layer 16 extends rearward from the position recessed from the air bearing surface 30, on the trailing side of the main magnetic pole layer 12, and is coupled to the main magnetic pole layer 12. The auxiliary magnetic pole layer 16 has, for example, the plan configuration of a rectangular shape with the width W2, as indicated in FIG. 2.

The insulating layer 17 defines a throat height TH as being one of important factors which determine writing characteristics of the thin film magnetic head, and is arranged between the auxiliary magnetic pole layer 16 and the write shield layer 14. The forefront end position of the insulating layer 17 is the throat height zero position TP as described above. The distance between the throat height zero position TP and the air bearing surface 30 is the throat height TH. The insulating layer 17 is made of, for example, nonmagnetic insulating material such as alumina. In FIGS. 1 and 2, for example, the case is indicated where the throat height zero position TP is coincident with the flare point FP.

The thin film coil 19 generates the magnetic flux for writing. In the thin film coil 19, for example, a current flows in the opposite direction from the current direction of the thin film coil 8. The detailed configuration of the thin film coil 19 is, for example, similar to that of the thin film coil 8.

The insulating layers 18 and 20 electrically separate the thin film coil 19 from the periphery of the thin film coil 19, and are coupled to the insulating layer 17. The insulating layer 18 is made of, for example, a nonmagnetic insulating material which is the same as that of the insulating layers 10 and 11. The insulating layer 20 is made of, for example, nonmagnetic insulating material which is similar to that of the insulating layer 9. The forefront ends of the insulating layers 18 and 20 are, for example, recessed from the forefront end of the insulating layer 17.

The return yoke layer 21 mainly absorbs the magnetic flux which returns from the recording medium 40 to the write head portion 100B so that the magnetic flux is circulated between the recording medium 40 and the return yoke layer 21. There is a case where not only the return yoke layer 21 but also the write shield layer 14 has the circulation function of the magnetic flux. The return yoke layer 21 extends rearward from the air bearing surface 30 on the trailing side of the write shield layer 14 and the auxiliary magnetic pole layer 16. The return yoke layer 21 is coupled to the write shield layer 14 in the front, and coupled to the auxiliary magnetic pole layer 16 in the back gap BG in the rear. The return yoke layer 21 is made of, for example, magnetic material which is similar to that of the main magnetic pole layer 12, and has the plan configuration of a rectangular shape with the width W3, as indicated in FIG. 2. The return yoke layer 21 may be made of magnetic material different from that of the main magnetic pole layer 12.

[Configuration of Main Part of Thin Film Magnetic Head]

Next, the configuration of the main part of the thin film magnetic head will be described in detail. FIG. 4 illustrates the configuration of the end face on the air bearing surface 30 of the main part in the thin film magnetic head indicated in FIGS. 1 to 3. In FIG. 4, to easily distinguish the components in the configuration, the tip portion 12A and the write shield layer 14 are shaded. The thick line in FIG. 4 indicates a shape of a write bit (write bit pattern P) which is obtained at the time of writing.

Each of the tip portion 12A, the side gap layer 13, the write shield layer 14, and the trailing gap layer 15 has its end face on the air bearing surface 30. Here, the expression "each of the tip portion 12A, the side gap layer 13, the write shield layer 14, and the trailing gap layer 15 has its end face on the air bearing surface 30" means that the end faces of the tip portion 12A and the like are located in the plane of the air bearing surface 30.

The end face of the tip portion 12A on the air bearing surface 30 has a wide width on the trailing side, in comparison with the leading side. In detail, the end face of the tip portion 12A has an edge located on the trailing side (trailing edge TD), an edge located on the leading side (leading edge LE), and two edges located between the trailing edge TE and the leading edge LE (side edges SE). Thereby, the end face of the tip portion 12A has the configuration in which the width W1 of the trailing edge TE is larger than the width W4 of the leading edge LE. The trailing edge TE is substantially a write place in the tip portion 12A, and the width W1 of the trailing edge TE is, for example, 0.2 µm or less. The side edge SE may be in a straight-line shape, or a bent shape or a curved shape. The side edge SE may be in the mixed state of the straight-line shape, the bent shape, and the curved shape.

In the end face of the tip portion 12A, for example, when comparing the widths W1 and W4 with a width W5 which is located in an any position between the trailing edge TE and the leading edge LE, the relationship of W1>W4 and W1≧W5 is satisfied. In this case, the width W4 may be larger than zero, or may be substantially zero. The case where the width W4 is larger than zero means that the configuration of the end face includes the leading edge LE as one side. On the other hand, the case where the width W4 is substantially zero means that the configuration of the end face includes the leading edge LE as a top of a corner section.

Here, the shape of the end face of the tip portion 12A is, for example, a trapezoid (inverted trapezoid) including the trailing edge TE as a top face (long side) and the leading edge LE as a bottom face (short side). In this case, a bevel angle θ (angle of a base angle) is not specifically limited.

The write shield layer 14 surrounds the tip portion 12A, with the side gap layer 13 and the trailing gap layer 15 in between, from three sides of the both sides and the trailing side. The end face of the write shield layer 14 on the air bearing surface 30 has a side edge PE which faces the side edge SE of the tip portion 12A, with the side gap layer 13 in between. The side edge PE may be in a straight-line shape, or a bent shape or a curved shape. The side edge PE may be in the mixed state of the straight-line shape, the bent shape, and the curved shape.

In the write shield layer 14, the sections located on both sides of the tip portion 12A function as a pair of side shields, and the section located on the trailing side of the tip portion 12A functions as a trailing shield. In FIG. 4, there is a broken line which indicates a boundary between the sections which function as the side shields, and the section which functions as the trailing shield.

Here, a gap length of the side gap SG on the air bearing surface 30 (distance between the tip portion 12A and the write shield layer 14 in the width direction) is varied in the thickness direction. In detail, the gap of the side gap SG in the thickness direction is separated to three portions, and thus the gap length of the side gap SG located on the trailing edge TE is defined as D1, the gap length of the side gap SG located on the leading edge LE is defined as D2, and the gap length of the side gap SG located in any position between the trailing edge TE and the leading edge LE is defined as D3. In this case, the gap lengths D1 to D3 satisfy the relationship of D1<D2, D1<D3 and D3≥D2. Thereby, in the write shield layer 14, in the sections located on both sides of the tip portion 12A (sections which function as the side shields), the portion in the vicinity of the trailing edge TE is locally close to the tip portion 12A, while the portion except for the portion in the vicinity of the trailing edge TE is away from the tip portion 12A. Here, "the portion except for the portion in the vicinity of the trailing edge TE" means the portion in the vicinity of the leading edge LE, and the portion between the trailing edge TE and the leading edge LE (middle portion).

As an example of the gap lengths D1 to D3, the gap length D1 is 0.01 μm to 0.1 μm, the gap length D2 is 0.04 μm to 0.15 μm, and the gap length D3 is 0.04 μm to 0.15 μm.

Here, the gap length D3 is, for example, equal to the gap length D2 in dimension. In this case, the side edge PE of the write shield layer 14 is, for example, in a straight-line shape, and is approximately parallel to the side edge SE of the tip portion 12A, in the portion except for the portion in the vicinity of the trailing edge TE. The side edge PE is, for example, bent in the position where the gap length D3 is the maximum in dimension. The write shield layer 14 is locally close to the tip portion 12A on the trailing side, in comparison with the position where the side edge PE is bent.

The write shield layer 14 may have a single-part structure (structure formed with a single step), or may have a plurality-parts-assembled structure (structure formed with a plurality of steps).

Here, the write shield layer 14 includes, for example, a pair of bottom write shield layers 14A and 14B, and the top write shield layer 14C, which are formed separately from each other (with separate steps). The bottom write shield layers 14A and 14B are located on both bottom sides of the tip portion 12A, and each have a thickness smaller than that of the tip portion 12A. The top write shield layer 14C is formed on the bottom write shield layers 14A and 14B, and is located on both top sides and the trailing side of the tip portion 12A. The top write shield layer 14C is coupled to the bottom write shield layers 14A and 14C. The bottom write shield layers 14A and 14B, and the top write shield layer 14C may be formed with the same material, or may be formed with different material.

In this case, the thickness of each of the bottom write shield layers 14A and 14B is, for example, reduced on the side away from the tip portion 12A, in comparison with the side close to the tip portion 12A. This variation in thickness is generated due to a step of forming the write shield layer 14, which will be described later.

[Configuration of Recording Medium]

Figure 5:
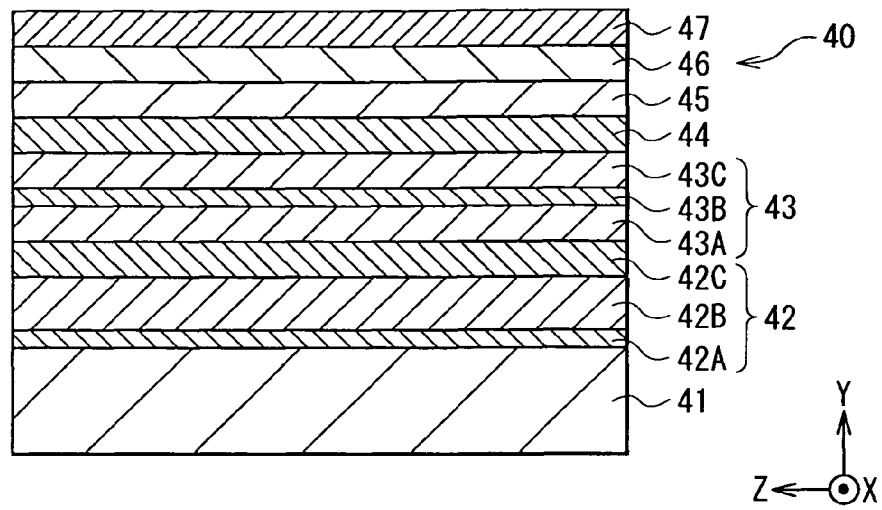
FIG. 5 is a cross-sectional view illustrating the configuration of the recording medium.

Next, the specific configuration of the recording medium 40 will be described. FIG. 5 illustrates the cross-sectional configuration of the recording medium 40.

The recording medium 40 has, for example, the configuration in which a flux path layer 42, a soft magnetic backing layer 43, a nonmagnetic layer 44, a hard magnetic recording layer 45, a protective layer 46, and a lubricating layer 47 are stacked in this order on a substrate 41. The flux path layer 42 functions as a flow path of the magnetic flux in the recording medium 40, and has, for example, the configuration in which nonmagnetic layers 42A and 42C are stacked with a soft magnetic layer 42B in between. The soft magnetic backing layer 43 has, for example, the configuration in which soft magnetic layers 43A and 43C are stacked with a nonmagnetic layer 43B in between. The hard magnetic recording layer 45 is magnetized with the perpendicular magnetic field (information is magnetically written).

The substrate 41 is, for example, an aluminum disk plated with nickel-phosphorus (NiP), and the thickness of the substrate 41 is arbitrary. In the flux path layer 42, for example, the nonmagnetic layer 42A is made of titanium (Ti: approximately 1 nm in thickness), the soft magnetic layer 42B is made of an alloy of cobalt, nickel, and iron (CoNiFe: approximately 100 nm to 200 nm in thickness), and the nonmagnetic layer 42C is made of nickel-phosphorus (approximately 100 nm in thickness), respectively. The flux path layer 42 has permeability higher than that of the soft magnetic backing layer 43. This is because, the magnetic field (perpendicular magnetic field) from the thin film magnetic head is highly absorbed in the recording medium 40, and thereby the writing performance improves. It is also because, the flux path layer 42 is located away from the hard magnetic recording layer 45 and magnetic mutual interaction between the flux path layer 42 and the hard magnetic recording layer 45 is small, and thereby instability in writing (erasure of an immediately-adjacent track or the like) is little concerned. In the soft magnetic backing layer 43, for example, the soft magnetic layer 43A is made of a boride alloy including iron, cobalt, zirconium, and tantalum (FeCoZrTaB: approximately 50 nm in thickness), the nonmagnetic layer 43B is made of ruthenium (Ru: approximately 0.8 nm in thickness), and the soft magnetic layer 43C is made of an iron, cobalt, zirconium, and tantalum boride alloy (approximately 50 nm in thickness), respectively. The nonmagnetic layer 44 is made of, for example, a mixture (approximately 30 nm in thickness) of an alloy of ruthenium and chrome (RuCr), and silicon oxide ($SiO_2$). The hard magnetic recording layer 45 is made of, fore example, a mixture (approximately 25 nm in thickness) of an alloy of cobalt, platinum, and chrome (CoPtCr), and silicon oxide. The protective layer 46 is made of, for example, carbon (approximately 2 nm in thickness).

However, the configuration of the recording medium 40 is not always limited to the configuration described above.

[Operation of Thin Film Magnetic Head]

The thin film magnetic head operates as follows.

At the time of writing information, when a current flows from an external circuit which is not illustrated in the figure, to the thin film coil 19 in the write head portion 100B, a magnetic flux J for writing is generated. This magnetic flux J is accommodated in the main magnetic pole layer 12 and the auxiliary magnetic pole layer 16, and then flows inside the main magnetic pole layer 12 toward the tip portion 12A. At this time, since the magnetic flux J is narrowed at the flare point FP, the magnetic flux J is finally focused on the vicinity of the trailing edge TE. When the magnetic flux J is released outside and the perpendicular magnetic field is generated, the hard magnetic recording layer 45 is magnetized with the perpendicular magnetic field. Thus, information is magnetically recorded in the recording medium 40.

In this case, since the current flows to the thin film coils 8 and 19 in the directions opposite from each other, the magnetic flux is generated in the thin film coils 8 and 19 in the directions opposite from each other. In detail, the magnetic flux for writing is generated toward the leading side in the thin film coil 19, while the magnetic flux for suppressing leakage is generated toward the trailing side in the thin film coil 8. Thereby, the magnetic flux for writing becomes less likely to be leaked to the read head portion 100A. Thus, reduction of the detection accuracy in the MT element 6 is suppressed. Also, generation of unnecessary magnetic field is generated due to absorption of the magnetic flux for writing in the bottom lead shield layer 3 and the top lead shield layer 5, and unintentional erasure of the information recorded in the recording medium 40 by the unnecessary magnetic field are suppressed.

When the magnetic flux J is released from the tip portion 12A, since a part of the magnetic flux J (spread component) is absorbed in the write shield layer 14, spread of the perpendicular magnetic field is suppressed, and the gradient of that perpendicular magnetic field increases. The magnetic flux J absorbed in the write shield layer 14 is resupplied to the main magnetic pole layer 12 through the return yoke layer 21.

The magnetic flux J released from the main magnetic pole layer 12 to the recording medium 40 magnetizes the hard magnetic recording layer 45. Then, the magnetic flux J returns to the return yoke layer 21 through the flux path layer 42, and is resupplied to the main magnetic pole layer 12. Thereby, the magnetic flux J circulates between the write head portion 100B and the recording medium 50. In this manner, the magnetic circuit is established.

On the other hand, at the time of reading information, when a sense current flows to the MR element 6 in the read head portion 100A, the resistance of the MR element 6 changes in response to the signal magnetic field for reading in the recording medium 40. This resistance change is detected as a voltage change, and the information recorded in the recording medium 40 is magnetically reproduced.

[Method of Manufacturing Thin Film Magnetic Head]

Next, a method of manufacturing the thin film magnetic head will be described. FIGS. 6 to 15 describe steps of forming the main part of the thin film magnetic head, and indicate the cross-sectional configurations corresponding to a part of FIG. 1(A).

Hereafter, with reference to FIG. 1, an outline of overall manufacture steps will be described. Then, with reference to FIGS. 1 to 15, steps of forming the main part will be described in detail. At this time, since the forming material, dimension, shape, and the like of the series of elements have been already described in detail, the descriptions corresponding to these are omitted as needed.

The thin film magnetic head is manufactured by mainly forming and stacking the series of elements in order through the use of an existing thin film process. As the existing thin film process, for example, there is a film formation technique such as electrolytic plating method or sputtering method, a patterning technique such as photolithography method, an etching technique such as dry etching method or wet etching method, or a polishing technique such as chemical mechanical polishing (CMP: chemical mechanical polishing).

When manufacturing the thin film magnetic head, as indicated in FIG. 1, first, the insulating layer 2 is formed on the substrate 1. Next, the bottom lead shield layer 3, the shielding gap layer 4 in which the MR element 8 is buried, and the top lead shield layer 5 are formed and stacked in this order on the insulating layer 2, and thereby the read head portion 100A is formed. Next, the separating layer 7 is formed on the read head portion 100A. Next, the thin film coil 8 buried with the insulating layers 9 to 11 is formed on the separating layer 7. Next, after the main magnetic pole layer 12 is formed on the insulating layer 11, the side gap layer 13 and the trailing gap layer 15 are formed, and the write shield layer 14 and the auxiliary magnetic pole layer 16 are formed. Next, the insulating layer 17 is formed between the write shield layer 14 and the auxiliary magnetic pole layer 16. Next, the write shield layer 14, the auxiliary magnetic pole layer 16, and the insulating layer 17 are planarized. Then, the thin film coil 19 buried with the insulating layers 18 and 20 is formed on the planarized plane of the write shield layer 14, the auxiliary magnetic pole layer 16, and the insulating layer 17. Next, the return yoke layer 21 is formed on the write shield layer 14, the auxiliary magnetic pole layer 16, and the insulating layer 20, and thereby the write head portion 100B is formed. Next, the overcoat layer 22 is formed on the write head portion 100B. Finally, the air bearing surface 30 is formed by collectively polishing the side face of the stacked structure from the substrate 1 to the overcoat layer 22, through the use of CMP method or the like. In this manner, the thin film magnetic head is completed.

Figure 6:
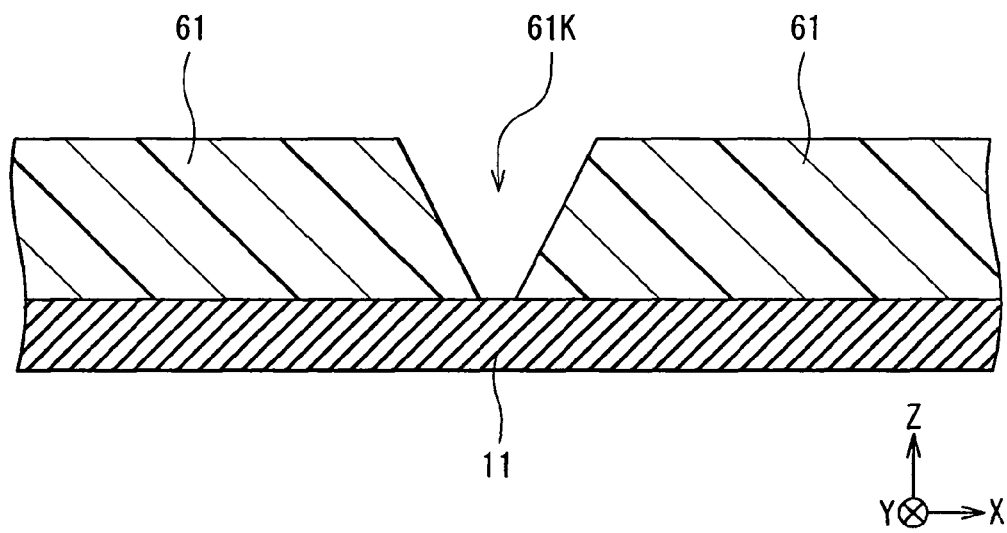
FIG. 6 is a cross-sectional view for explaining a step of manufacturing the main part of the thin film magnetic head.

When forming the main part of the thin film magnetic head, first, as indicated in FIG. 6, a photoresist pattern 61 having an opening 61K is formed on the insulating layer 11 as a base. In this case, a photoresist film is formed by applying photoresist on the surface of the insulating layer 11, and then the photoresist film is patterned (exposed and developed) through the use of photolithography method. Also, the photoresist pattern is so formed that the insulating layer 11 is exposed to the opening 61K, and the opening 61K is wide on the side away from the insulating layer 11, in comparison with the side close to the insulating layer 11.

Figure 7:
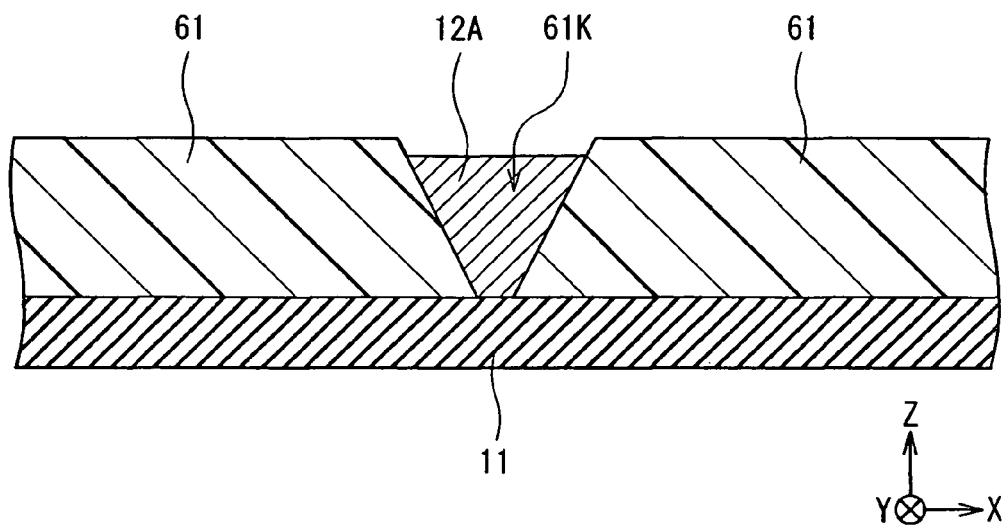
FIG. 7 is a cross-sectional view for explaining a step subsequent to FIG. 6.

Next, as indicated in FIG. 7, the tip portion 12A is formed in the opening 61K through the use of electrolytic plating method or the like. In this case, for example, after a seed layer is formed, a plating film is deposited by using the seed layer as an electrode film. Instead of electrolytic plating method, sputtering method or the like may be used.

Figure 8:
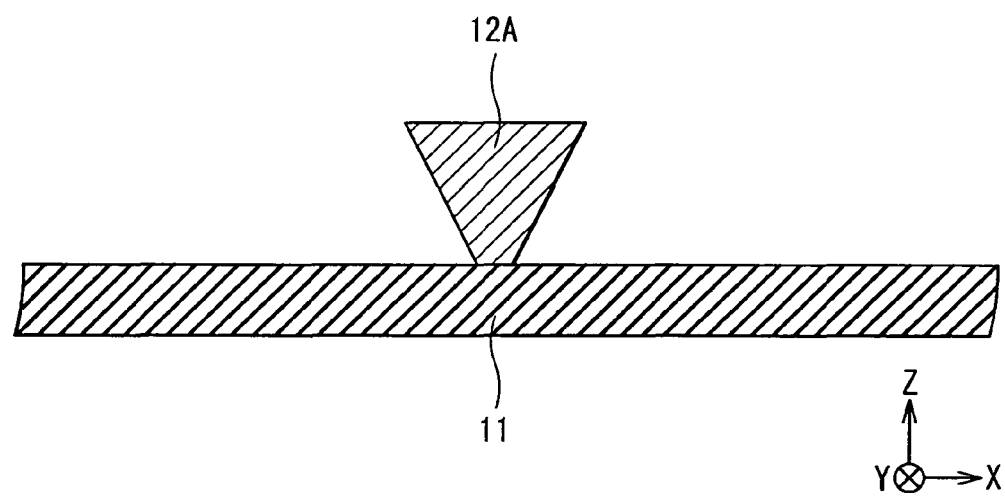
FIG. 8 is a cross-sectional view for explaining a step subsequent to FIG. 7.

Next, as indicated in FIG. 8, the both sides of the tip portion 12A are exposed by removing the photoresist pattern 61.

Figure 9:
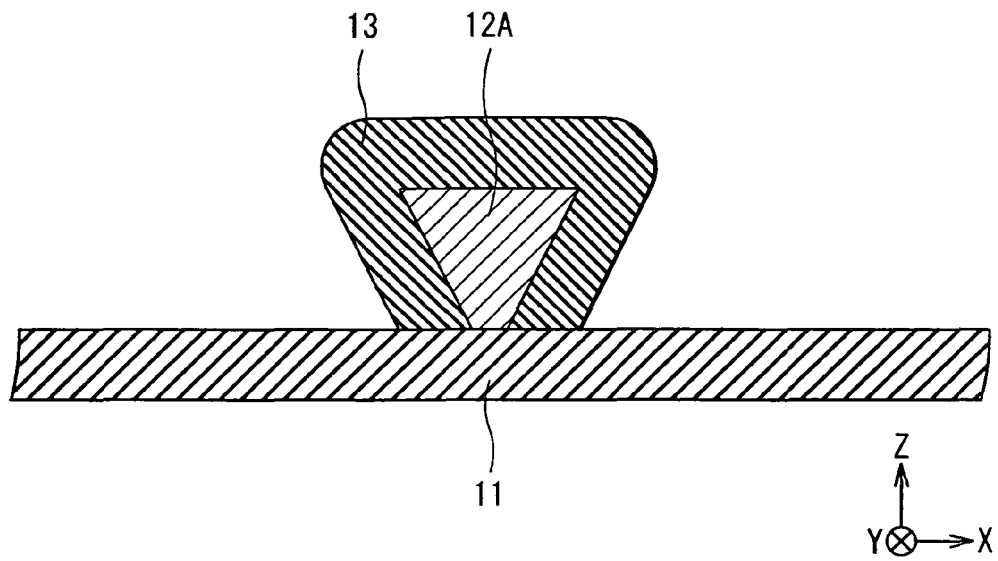
FIG. 9 is a cross-sectional view for explaining a step subsequent to FIG. 8.

Next, as indicated in FIG. 9, the side gap layer 13 is formed so as to cover the tip portion 12A, through the use of sputtering method or the like. In this case, for example, to equalize the gap lengths D2 and D3 in dimension as indicated in FIG. 4, the thickness of the side gap layer 13 is formed to be essentially approximately uniform.

Figure 10:
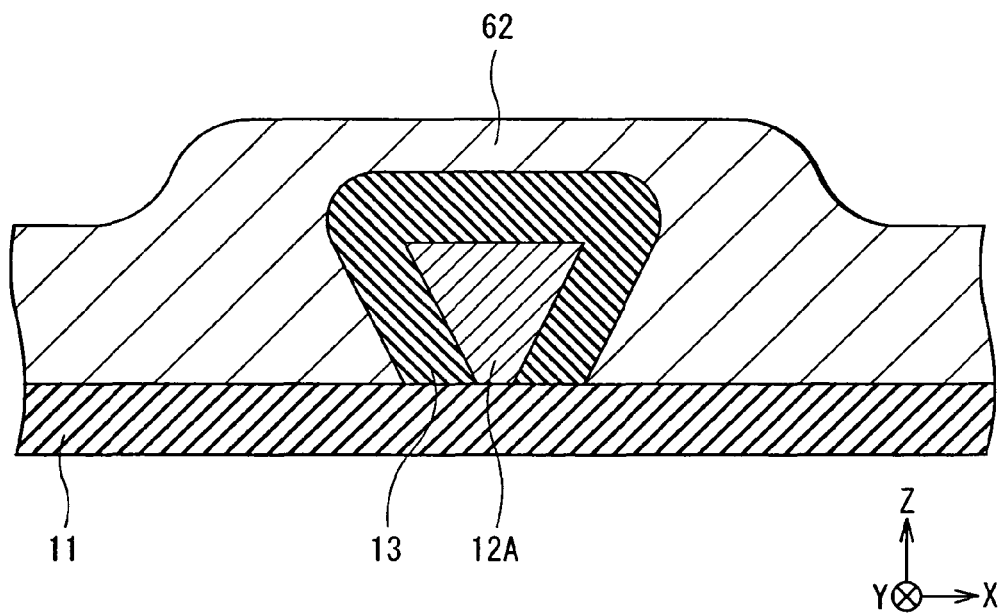
FIG. 10 is a cross-sectional view for explaining a step subsequent to FIG. 9.

Next, as indicated in FIG. 10, a shield layer 62 is formed so as to cover the tip portion 12A, the side gap layer 13, and the insulating layer 11 which is in the vicinity of the tip portion 12A and the side gap layer 13, through the use of electrolytic plating method or the like.

Figure 11:
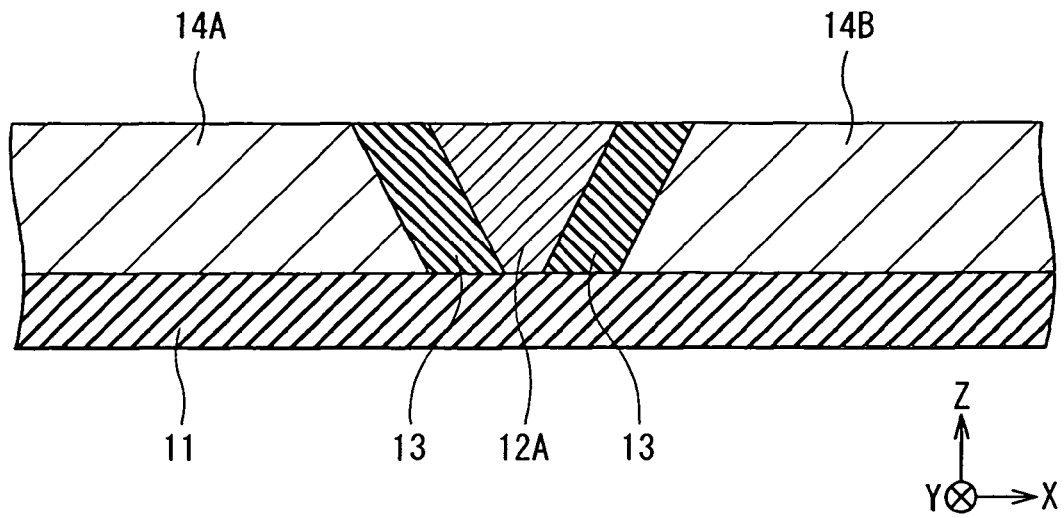
FIG. 11 is a cross-sectional view for explaining a step subsequent to FIG. 10.

Next, the shield layer 61 and the side gap layer 13 are polished and planarized through the use of CMP method or the like, until the tip portion 12A is exposed. In this case, to ensure that the tip portion 12A is exposed, polishing may be excessively performed, if necessary. Thereby, as indicated in FIG. 11, the bottom write shield layers 14A and 14B are formed on both sides of the tip portions 12A, with the side gap layer 13 in between.

Figure 12:
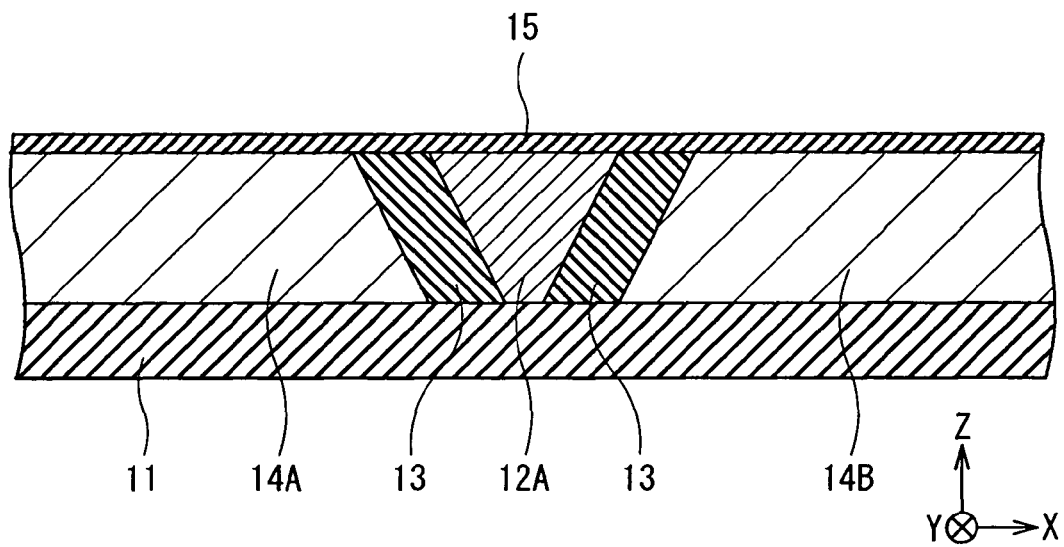
FIG. 12 is a cross-sectional view for explaining a step subsequent to FIG. 11.

Next, as indicated in FIG. 12, the trailing gap layer 15 is formed on the tip portion 12A, the side gap layer 13, and the bottom write shield layers 14A and 14B, through the use of sputtering method or the like.

Figure 13:
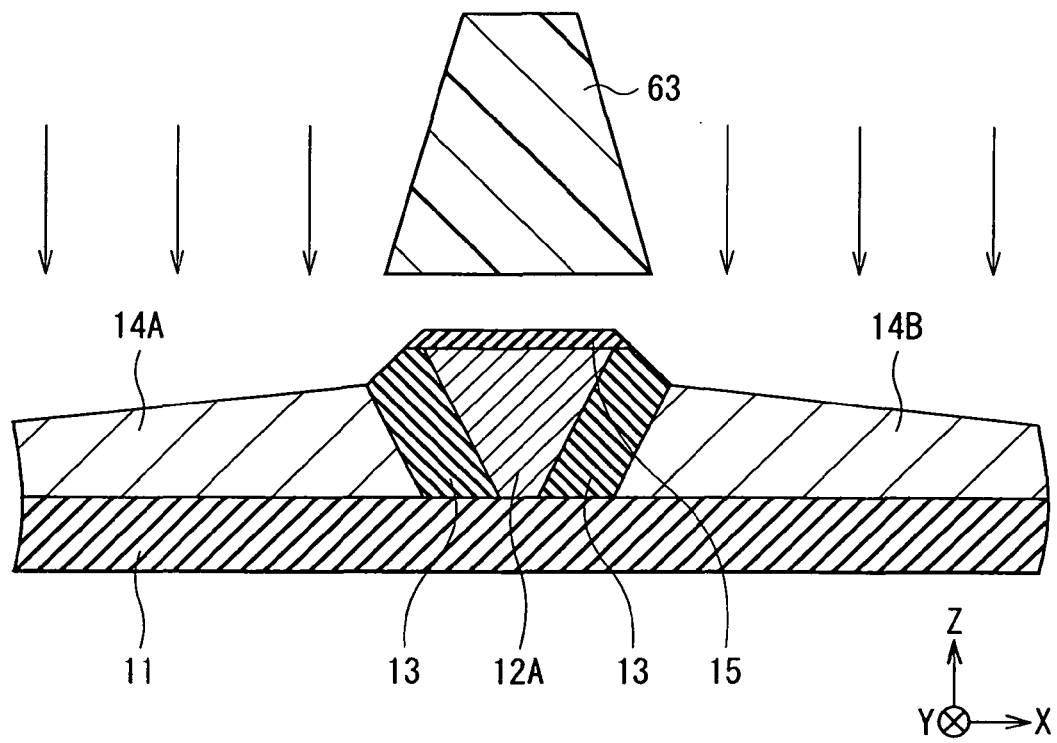
FIG. 13 is a cross-sectional view for explaining a step subsequent to FIG. 12.

Next, as indicated in FIG. 13, at least the side gap layer 13 and the trailing gap layer 15 are etched through the use of ion milling method or the like with a suspension-bridge-shaped mask 63. In this case, the mask 63 made of the photoresist pattern is formed through the use of photolithography method or the like so that the portion in the mask 63, which is located above the tip portion 12A, is away from the trailing gap layer 15 with a gap in between. If necessary, the application angle of an ion beam is adjusted so that the ion beam is applied to the surface of the trailing gap layer 15, in the oblique direction.

In the etching step, in a region which is not hidden behind the mask 63 (peripheral region of the mask 63), the bottom write shield layers 14A and 14B are etched and, in a region which is hidden behind the mask 63 (region below the mask 63), the side gap layer 13 and the trailing gap layer 15 are etched.

In detail, in the region which is not hidden behind the mask 63, the trailing gap layer 15 and the bottom write shield layers 14A and 14B are etched. Thereby, after the trailing gap layer 15 is removed, the bottom write shield layers 14A and 14B are dug down, and the thickness of the bottom write shield layers 14A and 14B is reduced. In this case, there is a tendency that etched material (material of the etched bottom write shield layers 14A and 14B) is easily deposited (reattached) on the side close to the mask 63, in comparison with the side away from the mask 63. Thus, the thickness of the bottom write shield layers 14A and 14B is small on the side away from the tip portion 12A, in comparison with the side close to the tip portion 12A.

On the other hand, in the region which is hidden behind the mask 63, the trailing gap layer 15 is narrowed by being slightly etched from both sides, and the portion in the side gap 13, which is not covered with the bottom write shield layers 14A and 14B, is also narrowed by being etched from both sides. Thereby, the side gap layer 13 and the trailing gap layer 15 are etched into a taper shape which includes the etching planes of both the side gap layer 13 and the trailing gap layer 15 in the same plane. In this case, to avoid exposure of the tip portion 12A, care should be taken not to etch the side gap layer 13 and the trailing gap layer 15 too much.

Figure 14:
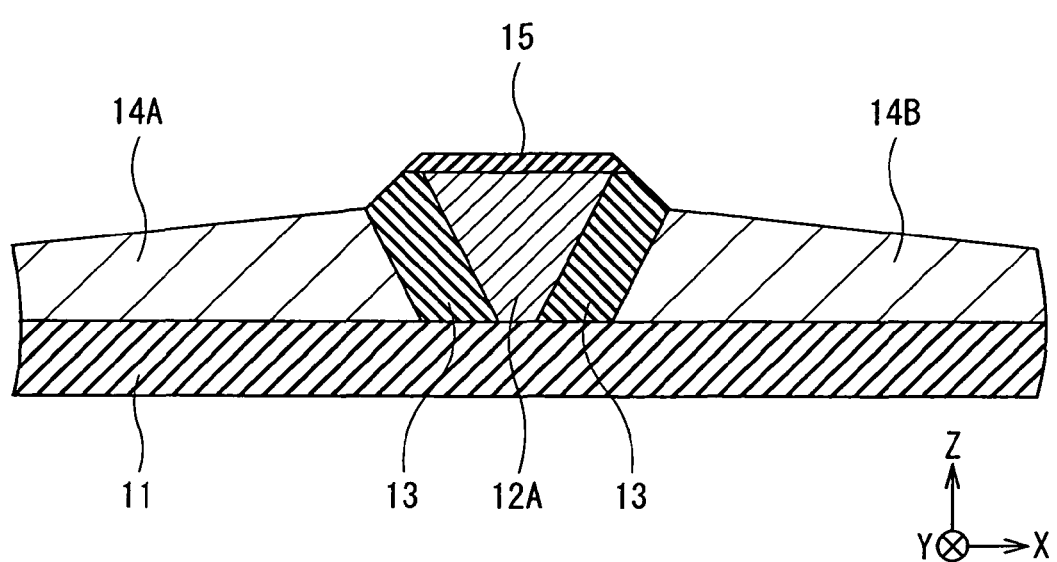
FIG. 14 is a cross-sectional view for explaining a step subsequent to FIG. 13.

Next, by removing the mask 63, as indicated in FIG. 14, the side gap layer 13 and the trailing gap layer 15, after being etched, are exposed.

Figure 15:
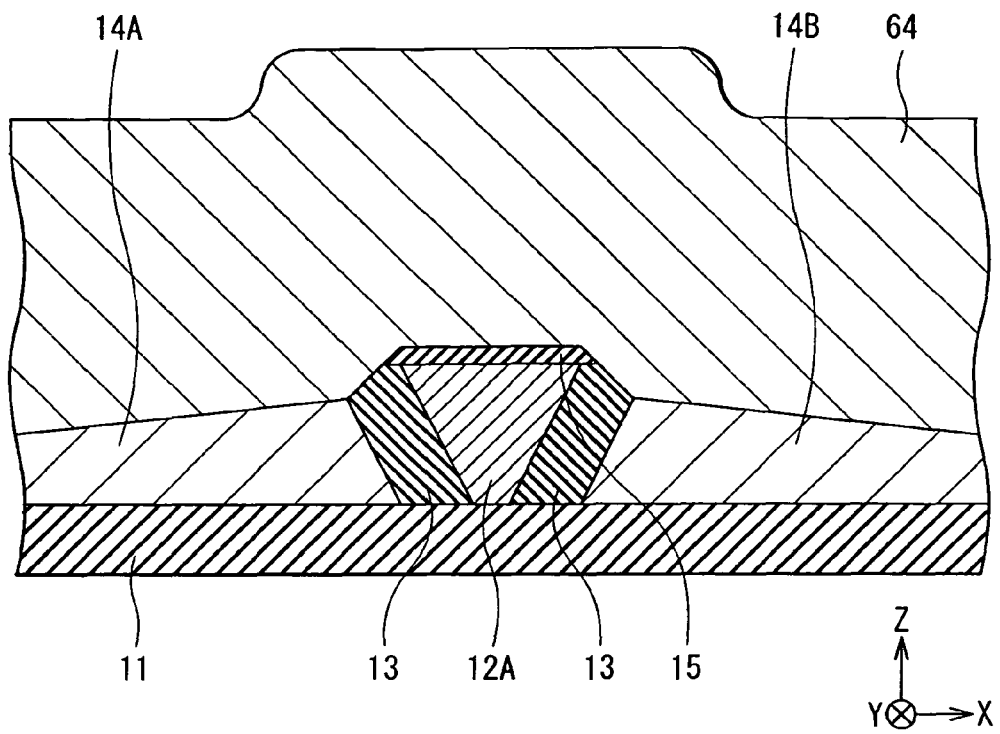
FIG. 15 is a cross-sectional view for explaining a step subsequent to FIG. 14.

Next, as indicated in FIG. 15, a shield layer 64 is formed so as to cover the side gap layer 13, the bottom write shield layers 14A and 14B, and the trailing gap layer 15, through the use of electrolytic plating method or the like. In this case, the shield layer 64 has the sufficient thickness so that steps formed with the side gap layer 13 and the trailing gap layer 15 are perfectly buried, at the time of planarizing the shield layer 64 in the subsequent step.

Finally, the shield layer 64 is polished and planarized until the portion in the shield layer 64, which is located above the tip portion 12A, has the desired thickness, through the use of CMP method or the like, and then the air bearing surface 30 is formed. Thereby, as indicated in FIG. 4, the write shield layer 14 including the bottom write shield layers 14A and 14B, and the top write shield layer 14C is formed. The tip portion 12A is surrounded with the write shield layer 14 with the side gap layer 13 and the trailing gap layer 15 in between. In this manner, the main part of the thin film magnetic head is completed.

[Operation and Effects of Thin Film Magnetic Head]

In the thin film magnetic head according to the embodiment, the write shield layer 14 (bottom write shield layers 14A and 14B) is arranged on both sides of the tip portion 12A which has an end face on the air bearing surface 30. In the end face of the tip portion 12A, the width W1 of the trailing edge TE is larger than the width W4 of the leading edge LE. The gap lengths D1 to D3 of the side gap SG on the air bearing surface 30 satisfy the relationship of D1<D2, D1<D3, and D3≥D2. Therefore, from the reasons below, it is possible to improve the writing performance.

Figure 4:
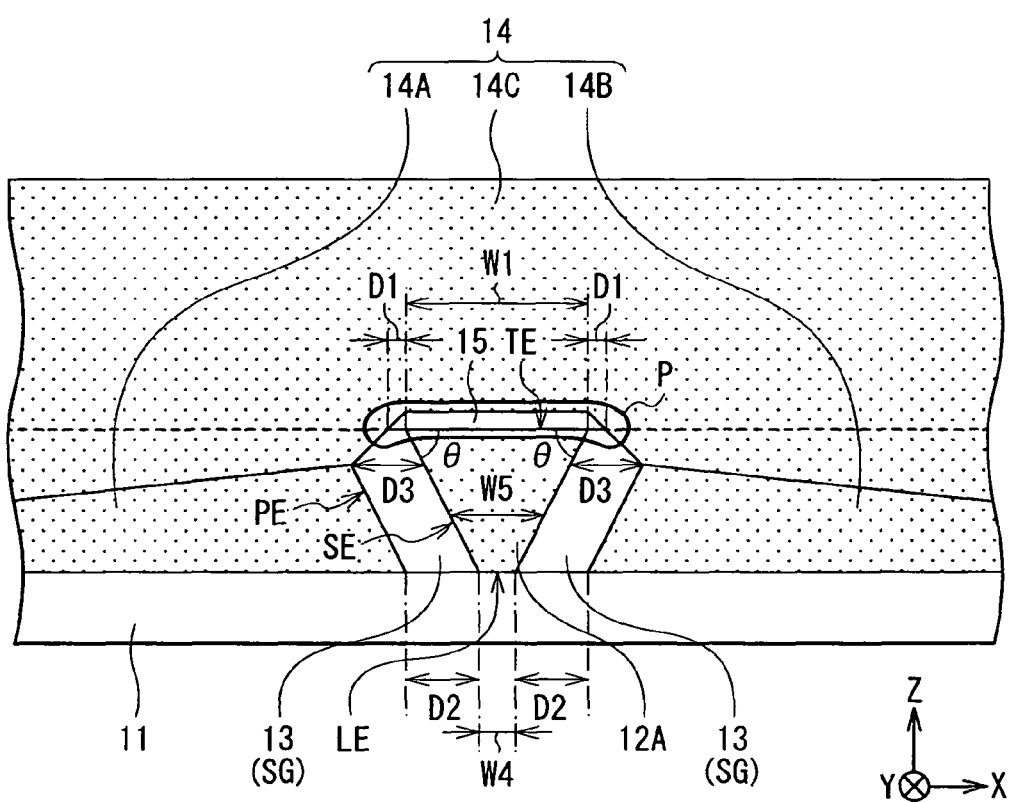
FIG. 4 is a plan view illustrating the configuration of an end face on an air bearing surface in the main part of the thin film magnetic head.
Figure 16:
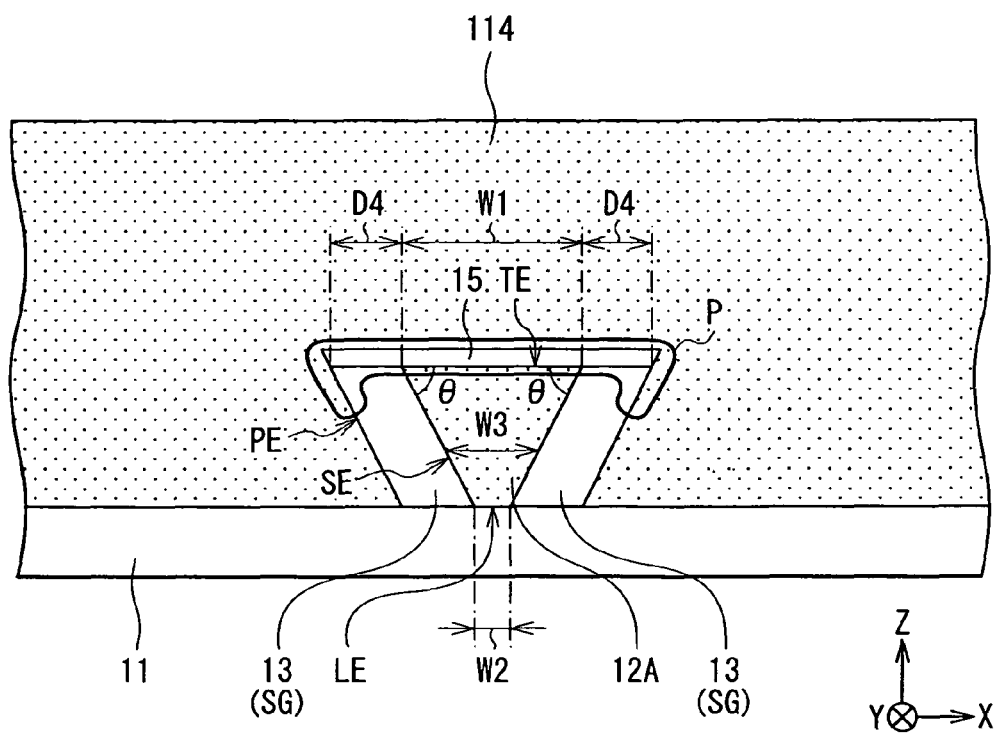
FIG. 16 is a plan view illustrating the configuration of an end face on an air bearing surface in a main part of a thin film magnetic head of a comparative example.

FIG. 16 illustrates the configuration of an end face of a main part in a thin film magnetic head of a comparative example, and corresponds to FIG. 4. The thin film magnetic head of the comparative example has the configuration which is similar to that of the thin film magnetic head according to the embodiment, except the points below. Instead of the write shield layer 14 of a plurality of parts, the thin film magnetic head of the comparative example includes a write shield layer 114 of a single part. A gap length D4 of a side gap SG on an air bearing surface 30 is uniform between the position of a trailing edge TE and the position of a leading edge LE. The formation range of a trailing gap layer 15 is extended to both sides.

In the writing process of the perpendicular magnetic writing method, the magnetic flux which flows inside the main magnetic pole layer 12 is narrowed at the flare point FP, and then flows to the tip portion 12A, as described above. Thus, the magnetic flux is likely to spread in the vicinity of the tip of the tip portion 12A. In particular, such a tendency is prominent in the vicinity of the trailing edge TE. In this case, to suppress spread of the perpendicular magnetic field, it is necessary to sufficiently absorb the spread component of the magnetic flux, in the write shield layer, by arranging the write shield layer close to the tip portion 12A in the width direction. On the other hand, to improve the magnitude of the perpendicular magnetic field, it is necessary to suppress excessive absorption of the magnetic flux by the write shield layer, by arranging the write shield layer away from the tip portion 12A in the width direction.

In the comparative example, since the gap length D4 is uniform, in a write shield layer 114, the portion in the vicinity of the trailing edge TE, the portion in the vicinity of the leading edge LE, and a middle portion between the trailing edge TE and the leading edge LE are located with the same distance away from the tip portion 12A. In this case, when the gap length D4 is set small, since the write shield layer 114 as a whole is close to the tip portion 12A, the spread component of the magnetic flux is likely to be absorbed in the portion in the vicinity of the trailing edge TE, while it is likely that the magnetic flux is excessively absorbed in the portion except for the portion in the vicinity of the trailing edge TE. Thereby, although the spread of the perpendicular magnetic field is suppressed, the magnitude of the perpendicular magnetic field becomes insufficient. On the other hand, when the gap length D4 is set large, since the write shield layer 114 as a whole is away from the tip portion 12A, the spread component of the magnetic flux becomes less likely to be sufficiently absorbed by the portion in the vicinity of the trailing edge TE, while the magnetic flux becomes less likely to be excessively absorbed in the portion except for the portion in the vicinity of the trailing edge TE. Thereby, although the magnitude of the perpendicular magnetic field increases, the spread of the perpendicular magnetic field is significant. From these reasons, in the comparative example, the relationship between ensuring the magnitude of the perpendicular magnetic field and suppression of the spread of the perpendicular magnetic field is a trade-off. In this case, in particular, when the spread of the perpendicular magnetic field is not suppressed, at the time of writing, the perpendicular magnetic field reaches not only the track to be written but also an immediately-adjacent track, and the immediately-adjacent track is easily erased. Moreover, the write bit pattern P is distorted while extending in the width direction, and the quality of the write bit is likely to be deteriorated. Therefore, it is difficult to improve the track density and the linear recording density while ensuring the magnitude of the perpendicular magnetic filed, and thus it is difficult to improve the writing performance.

On the other hand, in the embodiment, the gap lengths D1 to D3 are different. Specifically, the gap lengths D1 to D3 satisfy the relationship of D1<D2, D1<D3, and D3≥D2. Therefore, in the light shied layer 14, the difference in distance to the tip portion 12A is generated among the portion in the vicinity of the trailing edge TE, the portion in the vicinity of the leading edge LE, and the middle portion between the trailing edge TE and the leading edge LE. In this case, since the portion in the vicinity of the trailing edge TE is locally close to the tip portion 12A, the spread component of the magnetic flux is likely to be sufficiently absorbed in the portion in the vicinity of the trailing edge TE. Moreover, since the portion except for the portion in the vicinity of the trailing edge TE is away from the tip portion 12A, the magnetic flux is less likely to be excessively absorbed in the portion except for the portion in the vicinity of the trailing edge TE. Thereby, the magnitude of the perpendicular magnetic field increases, and the spread of the perpendicular magnetic field is suppressed. From these reasons, in the embodiment, both ensuring the magnitude of the perpendicular magnetic field and suppression of the spread of the perpendicular magnetic field are realized. Moreover, at the time of writing, since the perpendicular magnetic field less likely to reach the immediately-adjacent track, the immediately-adjacent track is less likely to be erased. Since the write bit pattern P is narrowed to have a straight-line shape, the quality of the write bit is also improved. Therefore, the track density and the linear recording density improve while assuring the magnitude of the perpendicular magnetic field, and thus it is possible to improve the writing performance.

In the method of manufacturing the thin film magnetic head according to the embodiment, after forming the tip portion 12A having the cross-sectional configuration in which the width W1 of the trailing edge TE is larger than the width W4 of the leading edge LE, the side gap layer 13 is formed on both sides of the tip portion 12A. Next, the trailing gap layer 15 is formed on the tip portion 12A and the side gap layer 13, and then the side gap layer 13 and the trailing gap layer 15 are etched through the use of the suspension-bridge-shaped mask 63. Thereby, the side gap layer 13 and the trailing gap layer 15 are etched from the both sides into a taper shape. In this manner, the thin film magnetic head in which the gap lengths D1 to D3 of the side gap SG on the air bearing surface 30 satisfy the relationship described above is easily manufactured with favorable reproducibility.

[Modification of Configuration of Thin Film Magnetic Head]

Figure 17:
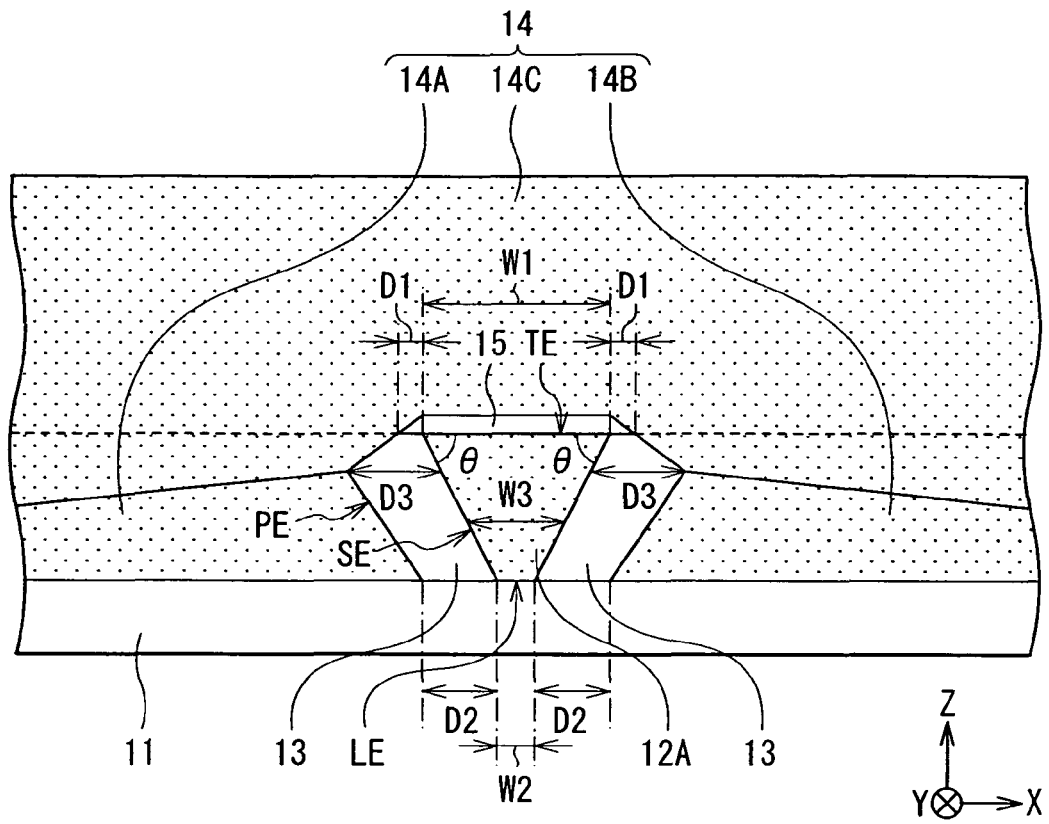
FIG. 17 is a cross-sectional view for explaining a first modification with respect to the configuration of the main part of the thin film magnetic head.
Figure 18:
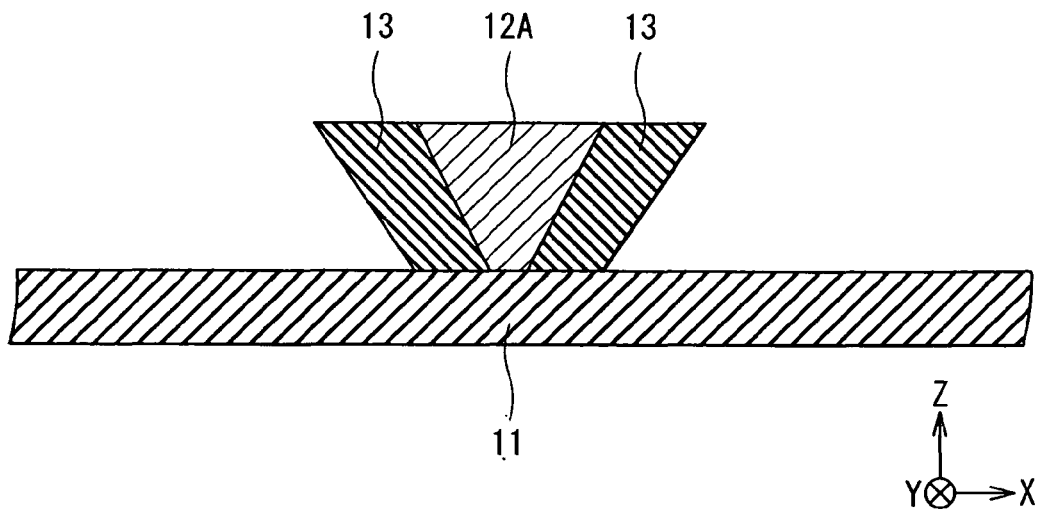
FIG. 18 is a cross-sectional view for explaining a manufacture method in the first modification.

In FIG. 4, the gap length D3 is equal to the gap length D2 in dimension. However it is not always limited to this. For example, as indicated in FIG. 17, the gap length D3 may be set larger than the gap length D2. In this case, in the write shield layer 14, the middle portion is away from the tip portion 12A, and the magnetic flux is further less likely to be absorbed in the portion except for the portion in the vicinity of the trailing edge TE. Thereby, the magnitude of the perpendicular magnetic field is more increased. To form such a write shield layer 14, for example, as indicated in FIG. 18, the similar steps as the formation steps of the main part of the thin film magnetic head as described above are taken except that the side gap layer 13 is formed with the thickness which is large on the side away from the insulating layer 11, in comparison with the side close to the insulating layer 11, in the step of forming the side gap layer 13 (FIG. 9).

The write shield layer 14 indicated in FIG. 4 may include a portion having saturation magnetic flux density which is high (high-saturation magnetic flux density portion) in comparison with that of the tip portion 12A, in the position where the write shield layer 14 is immediately adjacent to the trailing gap layer 15, and faces at least the tip portion 12A.

Figure 19:
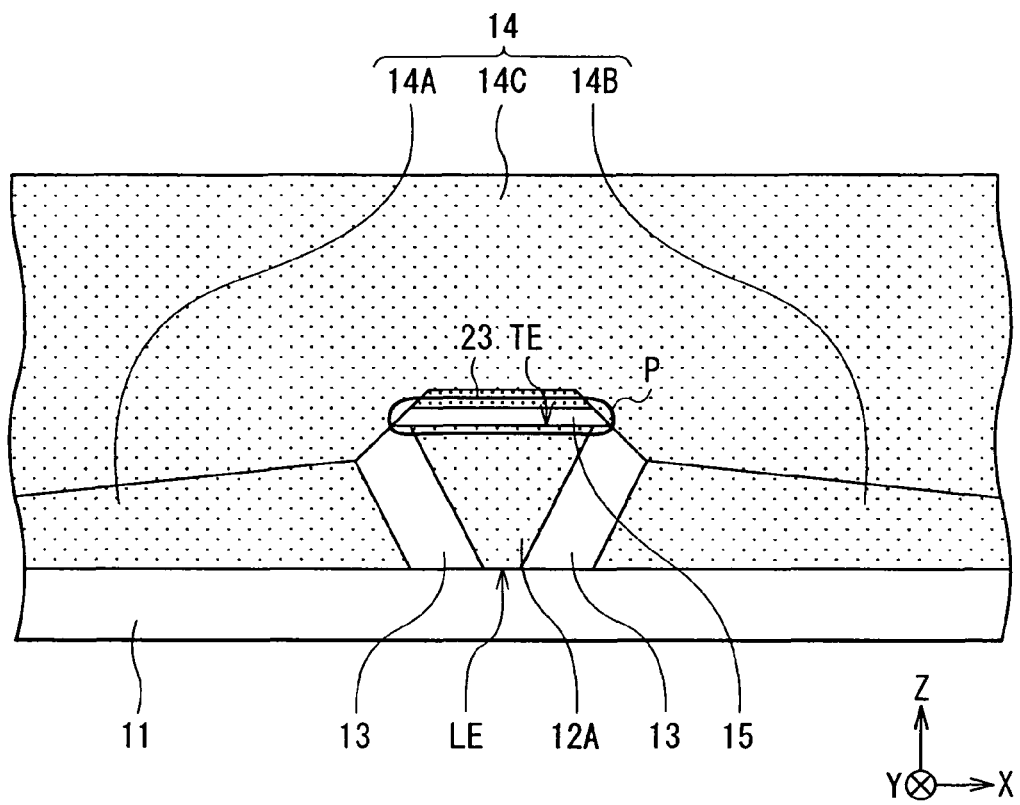
FIG. 19 is a cross-sectional view for explaining a second modification with respect to the configuration of the main part of the thin film magnetic head.
Figure 20:
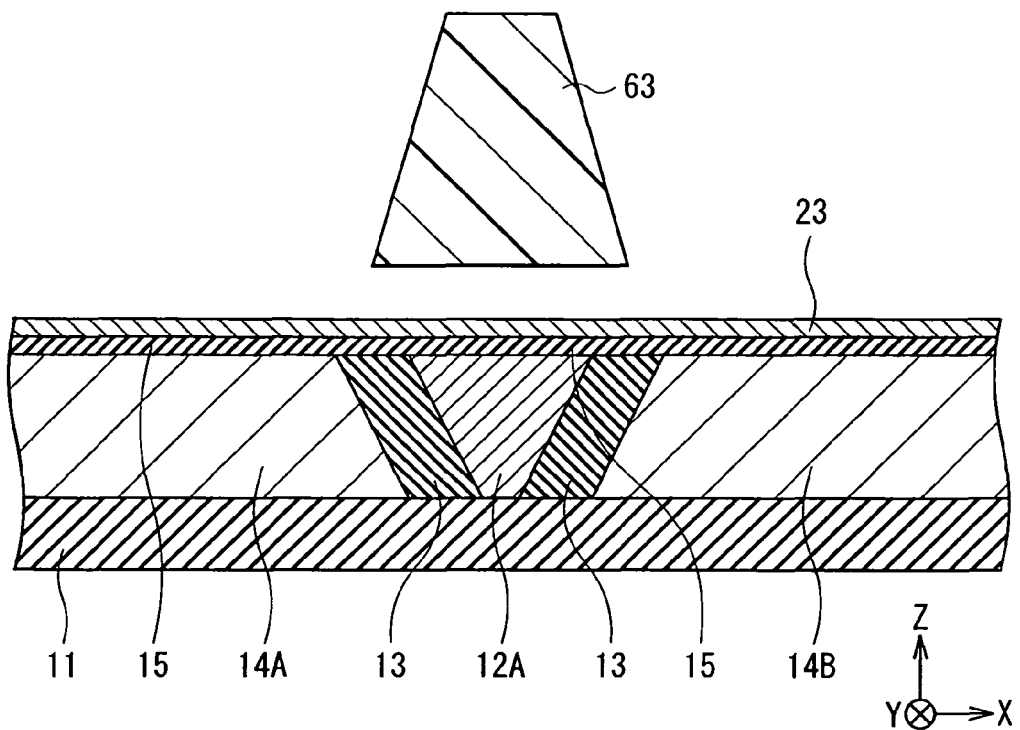
FIG. 20 is a cross-sectional view for explaining a manufacture method in the second modification.
Figure 21:
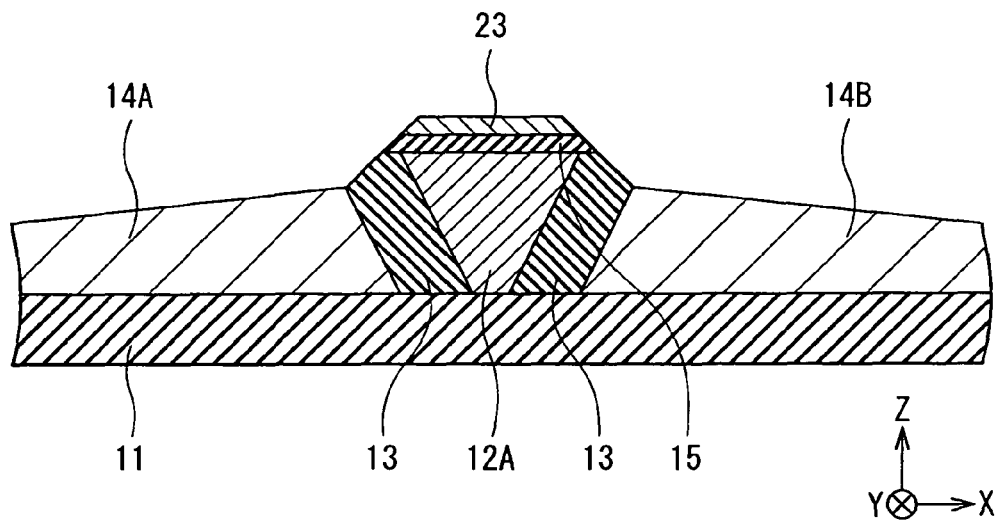
FIG. 21 is a cross-sectional view for explaining a step subsequent to FIG. 20.

Specifically, for example, as indicated in FIG. 19, the write shield layer 14 may include a high-saturation magnetic flux density portion 23 on the trailing gap layer 15. The high-saturation magnetic flux density portion 23 is made of, for example, an iron-based alloy such as an alloy of iron and cobalt, or an alloy of iron, cobalt, and nickel. The high-saturation magnetic flux density portion 23 has a taper shape in the same manner as the side gap layer 13 and the trailing gap layer 15. In this case, the material for the bottom write shield layers 14A and 14B and the material for the top write shield layer 14C may be the same, or may be different. As an example, the bottom write shield layers 14A and 14B are made of an alloy of nickel and iron, an alloy of cobalt, nickel, and iron (CoNiFe), or the like, and the top write shield layer 14C is made of an alloy of cobalt, nickel and iron, or the like. It is preferable that the saturation magnetic flux density of the write shield layer 14 (except for the high-saturation magnetic flux density portion 23) be lower than the saturation magnetic flux density of the main magnetic pole layer 12. To form such a high-saturation magnetic flux density portion 23, for example, as indicated in FIGS. 20 and 21, the similar formation steps to those of the main part of the thin film magnetic head described above are taken except that, subsequent to the step of forming the trailing gap layer 15 (FIG. 12), the high-saturation magnetic flux density portion 23 is formed so as to cover the trailing gap layer 15, through the use of sputtering method or the like, and then the etching step is performed through the use of the suspension-bridge-shaped mask 63 (FIG. 13). In this case, the magnetic flux becomes easy to be preferentially absorbed in the high-saturation magnetic flux density portion 23, and thus the gradient of the perpendicular magnetic field increases in the vicinity of the trailing edge TE, in the thickness direction. Thereby, erasure of the immediately-adjacent track is further less likely to occur, and the write bit pattern P is narrowed more to be in a substantially-straight line shape. Thus, it is possible to improve the writing performance more.

Figure 22:
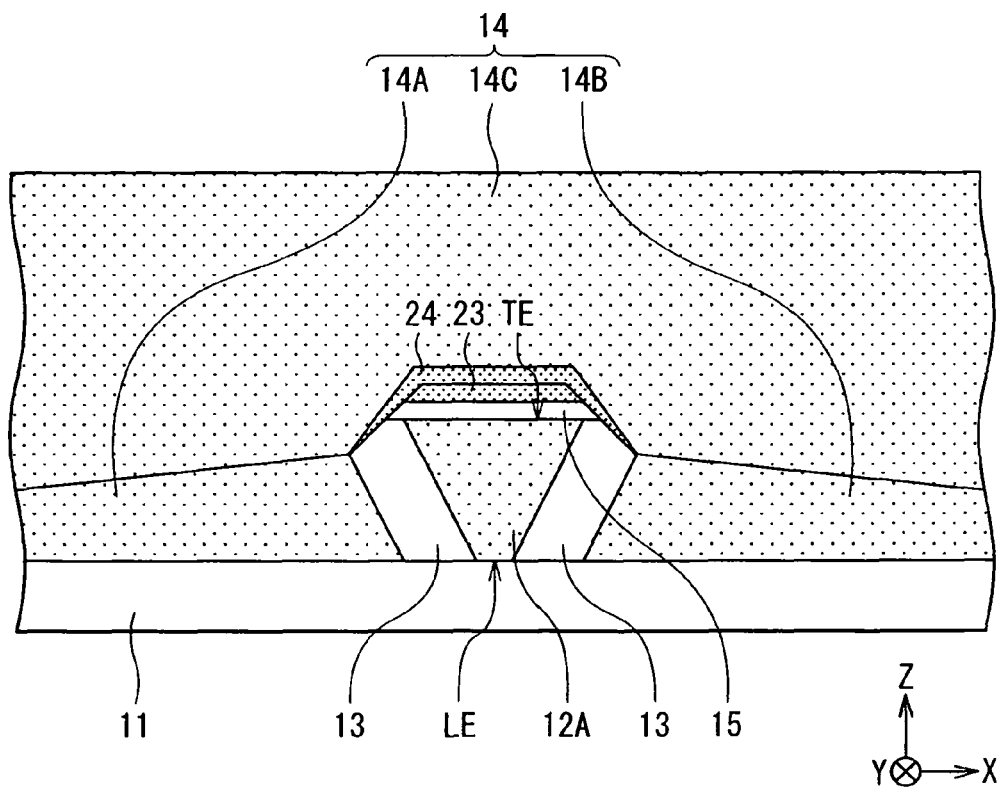
FIG. 22 is a cross-sectional view for explaining a third modification with respect to the configuration of the main part of the thin film magnetic head.

The formation range of the high-saturation magnetic flux density portion 23 is not limited to the range which faces the tip portion 12A, and may be extended in the width direction. In this case, for example, instead of extending the formation range of the high-saturation magnetic flux density portion 23 in the width direction, another high-saturation magnetic flux density portion may be added. Specifically, for example, as indicated in FIG. 22, in addition to the high-saturation magnetic flux density portion 23, the write shield layer 14 may include a high-saturation magnetic flux density portion 24 which faces the tip portion 12A while being immediately adjacent to the side gap layer 13 and the trailing gap layer 15, in cooperation with the high-saturation magnetic flux density portion 23. In this case, for example, it is preferable that the total thickness of the high-saturation magnetic flux density portions 23 and 24 become larger in the portion which faces the tip portion 12A, so that the magnetic flux is easily absorbed in the portion which faces the tip portion 12A, and the gradient of the perpendicular magnetic field increases. The material for the high-saturation magnetic flux density portion 24 may be similar to that of the high-saturation magnetic flux density portion 23, or may be different from that of the high-saturation magnetic flux density portion 23. To form such a high-saturation magnetic flux density portion 24, for example, subsequent to the step of forming the high-saturation magnetic flux density portion 23 (FIG. 21), the high-saturation magnetic flux density portion 24 is formed so as to cover the high-saturation magnetic flux density portion 23, the side gap layer 13, and the trailing gap layer 15, through the use of sputtering method or the like. Even in this case, it is possible to improve the writing performance.

However, in the case where the write shield layer 14 includes the high-saturation magnetic flux density portion, it is preferable that the formation range in the width direction of the high-saturation magnetic flux density portion be smaller than the width W1 of the trailing edge TE in the tip portion 12A. This is because, since the magnetic flux is likely to be preferentially absorbed in the high-saturation magnetic flux density portion, there is a possibility that the magnetic flux is easily spread in the vicinity of the trailing edge TE, when the width of the high-saturation magnetic flux density portion is larger than the width W1.

Figure 23:
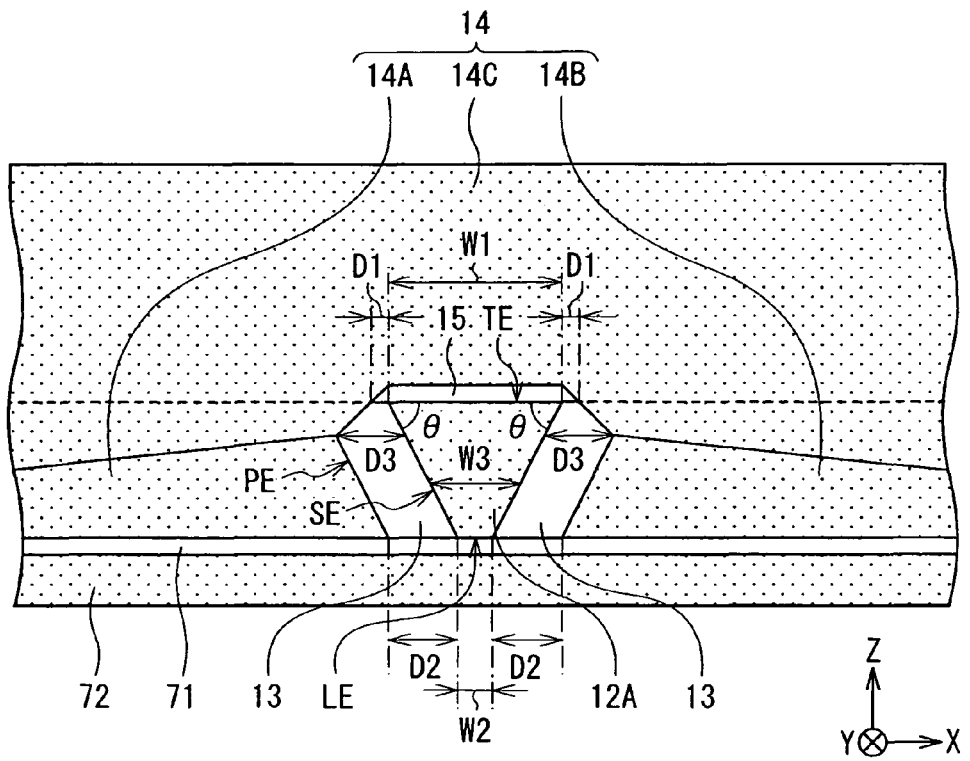
FIG. 23 is a cross-sectional view for explaining a fourth modification with respect to the configuration of the main part of the thin film magnetic head.

Also, for example, as indicated in FIG. 23, a leading shield layer 72 may be arranged on the leading side of the tip portion 12A so as to be away from the tip portion 12A, the side gap layer 13, and the write shield layer 14 with a leading gap layer 71 in between. The leading gap layer 71 is made of, for example, nonmagnetic insulating material which is similar to that of the side gap layer 13, and the trailing gap layer 15. The thickness of the leading gap layer 71 is 0.05 μm to 0.2 μm. The leading shield layer 72 is made of, for example, magnetic material which is similar to that of the write shield layer 14. In this case, since the magnetic flux is absorbed in the leading shield layer 72, the immediately-adjacent track is further less likely to be erased. Thus, it is possible to improve the writing performance more.

Figure 24:
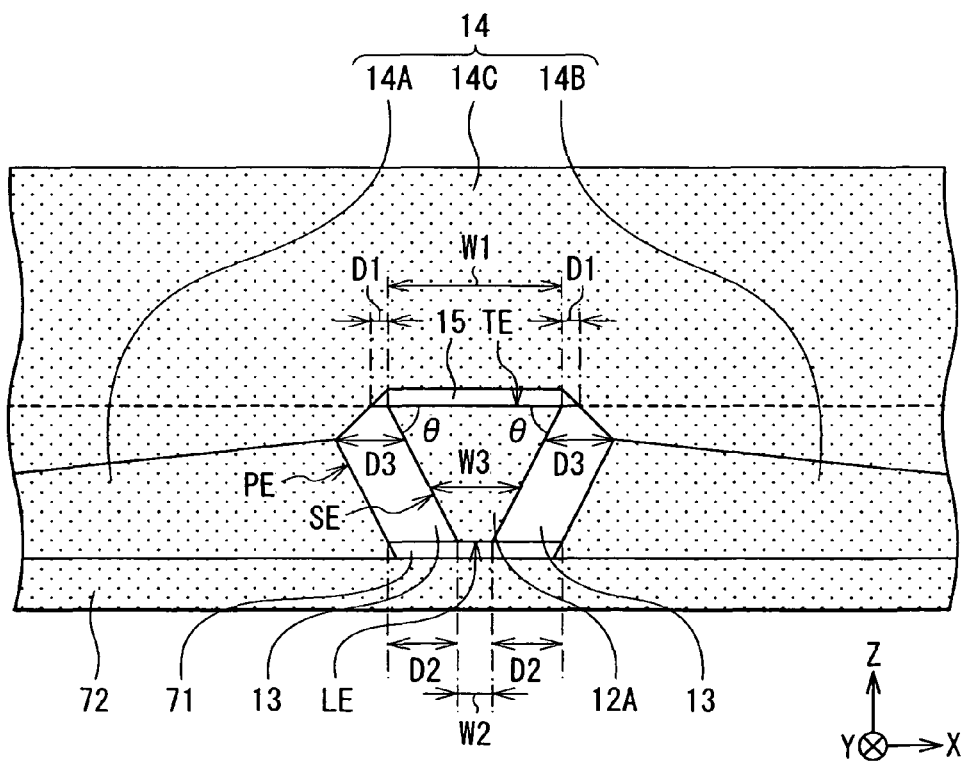
FIG. 24 is a cross-sectional view for explaining a fifth modification with respect to the configuration of the main part of the thin film magnetic head.

In this case, for example, as indicated in FIG. 24, by arranging the leading gap layer 71 in only the region between the tip portion 12A and the side gap layer 13, and the leading shield layer 72, the leading shield layer 72 may be coupled to the write shield layer 14 (bottom write shield layers 14A and 14B). Even in this case, it is possible to obtain the similar effects.

[Configuration of Magnetic Write Device Equipped with Thin Film Magnetic Head]

Figure 25:
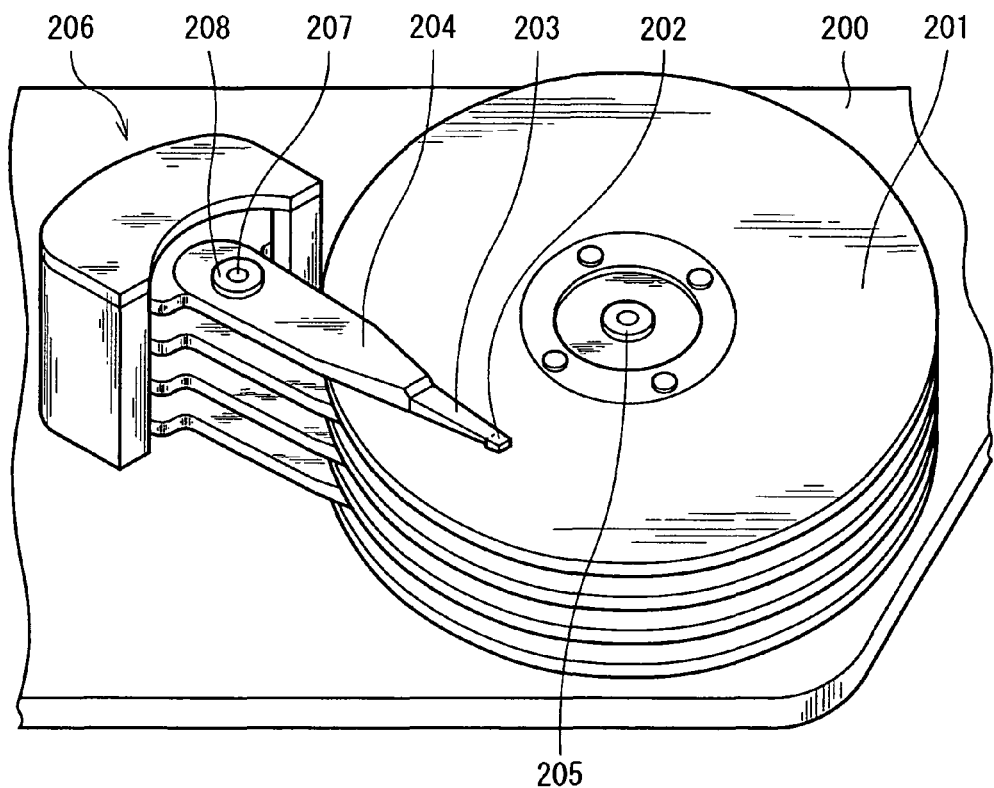
FIG. 25 is a perspective view illustrating the configuration of a magnetic write device mounted with the thin film magnetic head.
Figure 26:
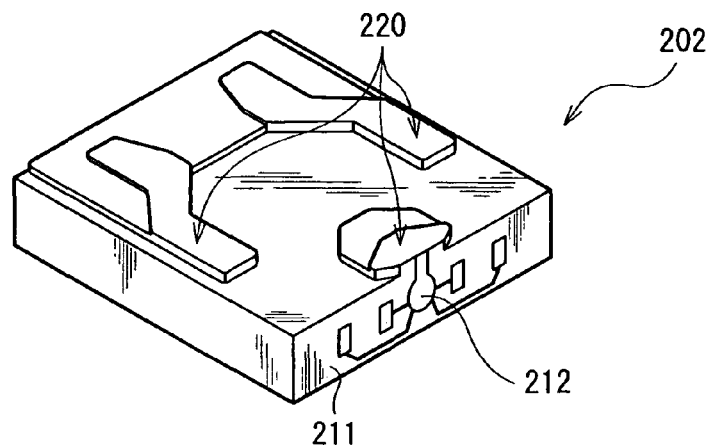
FIG. 26 is an enlarged-perspective view illustrating the configuration of a main part of the magnetic write device.

Next, the configuration of the magnetic write device which is mounted with the thin film magnetic head will be described. FIGS. 25 and 26 illustrate the configuration of the magnetic write device. FIG. 25 indicates the overall perspective configuration, and FIG. 26 indicates the perspective configuration of the main part, respectively.

As indicated in FIG. 25, for example, the magnetic write device is a hard disk drive, and includes a plurality of magnetic disks (hard disks) 201, a plurality of suspensions 203, and a plurality of arms 204, in a housing 200. The plurality of magnetic disks 201 correspond to the recording medium 40 (refer to FIG. 3). Each of the plurality of suspensions 203 is arranged corresponding to each of the magnetic disks 201, and supports a magnetic head slider 202 at one end. Each of the plurality of arms 204 supports the other end of each of the suspensions 203. The magnetic disk 201 is rotatable about a spindle motor 205 fixed to the housing 200. The arm 204 is connected to a drive section 206 as a power source, and is turnable about a fixed pivot 207 fixed to the housing 200, through a bearing 208. The drive section 206 includes a drive source such as a voice coil motor. The magnetic write device is, for example, a model in which the plurality of arms 204 are integrally turnable about the fixed pivot 207. In FIG. 25, for better viewing of the internal configuration of the magnetic write device, the housing 200 is partially omitted and indicated.

For Example, as indicated in FIG. 26, in the magnetic head slider 202, a thin film magnetic head 212 as being the above-described thin film magnetic head is attached on one surface of a substrate 211 which has a substantially rectangular solid structure made of nonmagnetic insulating material such as altic. On one surface of the substrate 211 (air bearing surface 220), for example, a concavo-convex structure is arranged to reduce air resistance which is generated at the turning time of the arm 204. On the other surface of the substrate 211 (surface on the right front side in FIG. 26), which intersects the air bearing surface 220, the thin film magnetic head 212 is attached. When the magnetic disk 201 rotates at the time of writing or reading information, the magnetic head slider 202 uses air flow generated between the writing surface of the magnetic disk 201 (surface which faces the magnetic head slider 202) and the air bearing surface 220, and thereby floats from the writing surface of the magnetic disk 201. In FIG. 26, for better viewing of the structure on the air bearing surface 220 side of the magnetic head slider 202, the structure is indicated upside down from FIG. 25.

In the magnetic write device, by turning the arm 204 at the time of writing or reading information, the magnetic head slider 202 is shifted to a predetermined region (write region) in the magnetic disk 201. Under the condition where the magnetic head slider 202 faces the magnetic disk 201, when electricity is supplied to the thin film magnetic head 212, the thin film magnetic head 212 performs a writing process or a reading process to the magnetic disk 201, based on the above-described operation principle.

In the magnetic write device, since the magnetic write device is mounted with the above-described thin film magnetic head, it is possible to improve the writing performance.

EXAMPLE

Next, a specific example according to the embodiment of the present invention will be described in detail.

The writing performance was examined in the thin film magnetic head according to the embodiment, which is indicated in FIG. 4, and the thin film magnetic head according to the comparative example, which is indicated in FIG. 16.

In the case of forming the main part of the thin film magnetic head according to the embodiment, a plating film of an alloy of iron and cobalt was deposited through the use of electrolytic plating method, and thereby the tip portion 12A was formed. In this case, in the tip portion 12A, the thickness was 0.2 μm, the width W1 of the trailing edge TE was 0.09 μm, the width W4 of the leading edge LE was 0.15 μm, and the bevel angle θ was 14°. Alumina was deposited through the use of sputtering method, and thereby the side gap layer 13, and the trailing gap layer 15 were formed. In this case, in the side gap layer 13 and the trailing gap layer 15, the gap length D1 was 0.05 μm, the gap lengths D2 and D3 were 0.11 μm, and the thickness of the trailing gap layer 15 was 0.03 μm. Moreover, a plating film of an alloy of iron and cobalt was deposited through the use of electrolytic plating method, and thereby the write shield layer 14 (the bottom write shield layers 14A and 14B, and the top write shield layer 14C) was formed.

In the case of forming the main part of the thin film magnetic head of the comparative example, the same steps as in the embodiment were taken except that the gap length D4 was 0.11 μm.

Figure 27:
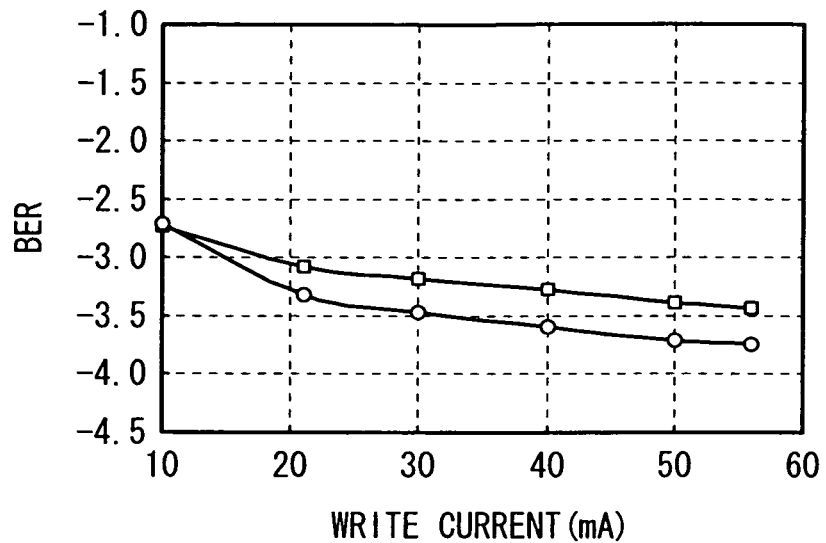
FIG. 27 is a view illustrating correlation between BER and a write current.
Figure 28:
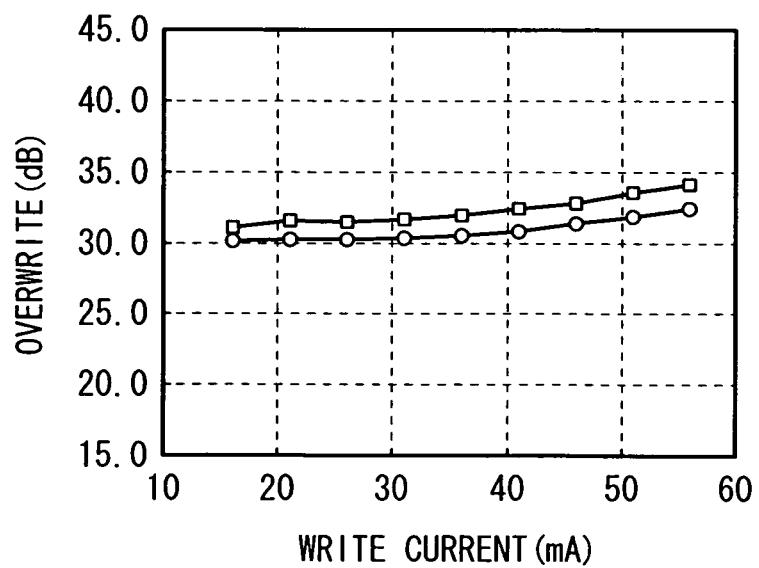
FIG. 28 is a view illustrating correlation between overwrite and the write current.

First, bit error rate (BER: bit error rate) and overwrite characteristics were examined while varying a write current (mA), and the results (○: embodiment; □: comparative example) indicated in FIGS. 27 and 28 were obtained.

In the case of examining BER, information was written once on the track to be written, and then written fifty times on the immediately-adjacent track. After that, BER was measured in the track to be written. In this case, the track pitch was 0.095 μm. Here, BER is a rate of a read error signal (error bit) to a write signal (written bit), that is, an error rate.

In the case of examining the overwrite characteristics, a signal of 25 MHz was written on the track to be written, and then a signal of 190 MHz was written on the same track. After that, a remaining amount of the signal of 25 MHz was measured through the use of a spectrum analyzer.

As indicated in FIG. 27, BER in the embodiment was remarkably reduced in comparison with that in the comparative example. Moreover, as indicated in FIG. 28, in the embodiment, the overwrite (dB) which was in the same level as that in the comparative example was obtained. This result indicates that the spread of the perpendicular magnetic field was suppressed, while the magnitude of the perpendicular magnetic field was ensured in the embodiment. In view of these results, in the embodiment, it is possible to improve BER while ensuring the overwrite characteristics.

Figure 29:
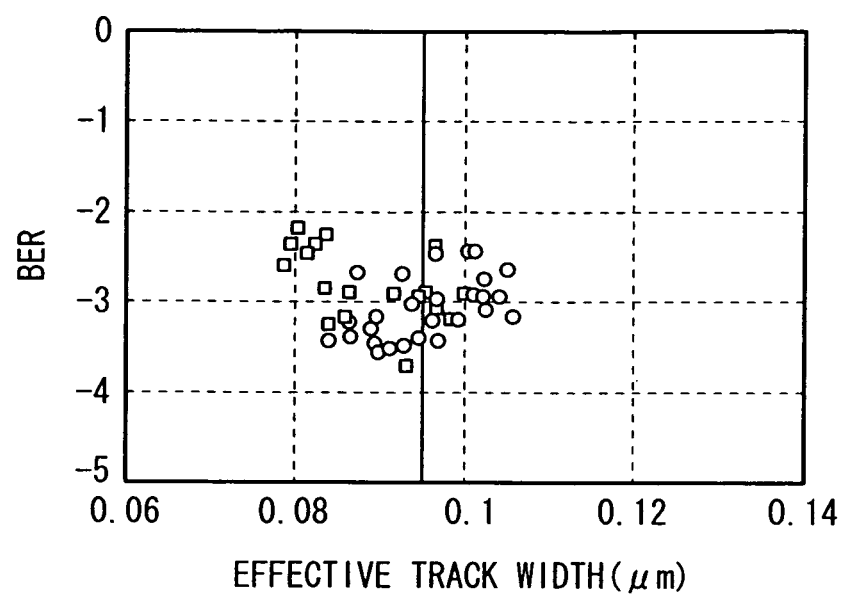
FIG. 29 is a view illustrating correlation between BER and an effective track width.

Next, BER was measured while varying the effective track width (here, the width W1 of the trailing edge TE), and the results indicated in FIG. 29 were obtained. In this case, the write current was 40 mA.

As indicated in FIG. 29, although BER was varied in response to the variation in the effective track width, the average value of BER was small in the embodiment, in comparison with the comparative example. This result indicates that although the conditions of the spread of the perpendicular magnetic field were varied in response to the effective track width, the spread was suppressed in the embodiment, in comparison with the comparative example. In view of these results, in the embodiment, it is possible to improve BER without depending on the effective track width.

Figure 30:
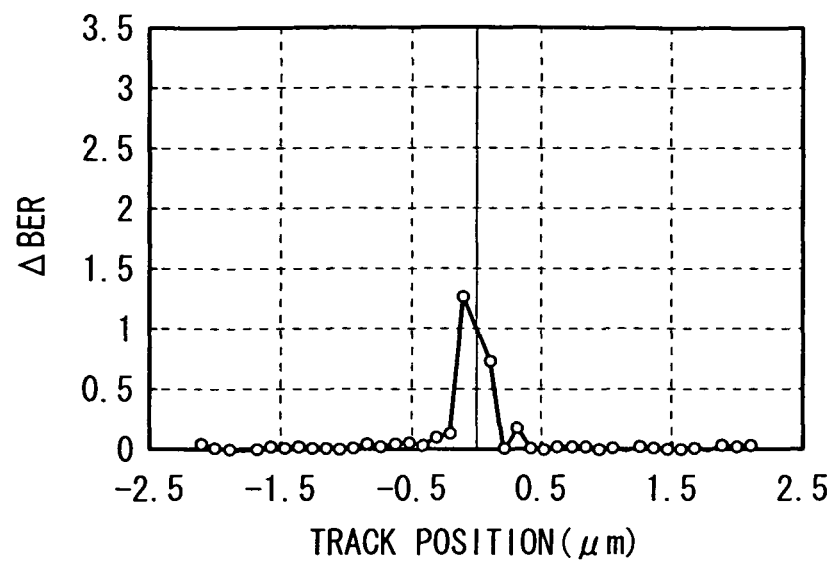
FIG. 30 is a view illustrating correlation between ΔBER and the effective track width.
Figure 31:
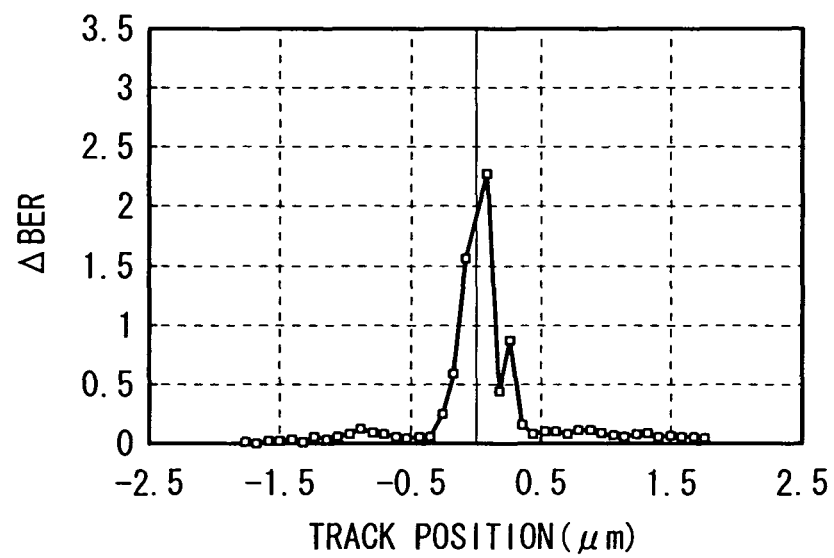
FIG. 31 is a view illustrating another correlation between ΔBER and the effective track width.

Finally, profile of the adjacent track erase (ATE: adjacent track erase) was examined, and the results indicated in FIGS. 30 and 31 were obtained.

In the case of examining the profile of ATE, first, information was written on tracks within a range of plus or minus 2 μm in the cross track direction about the track to be written, and BER was measured for each track. In this case, the track pitch was 0.095 μm, and the total number of tracks was 40. Next, information was additionally written 10000 times on the track to be written, and BER was measured again for each track. Finally, the difference of BER (ΔBER) before and after the additional writing was calculated. ΔBER indicates deterioration degree of BER. The track position (μm) equal to zero, which is indicated in FIGS. 30 and 31, corresponds to the center position of the track to be written.

As indicated in FIGS. 30 and 31, in the embodiment, ΔBER was small in the vicinity of the track to be written, in comparison with the comparative example. This result indicates that since the spread of the perpendicular magnetic field was suppressed in the embodiment, BER was less likely to be deteriorated. In view of these results, it is possible to suppress generation of ATE in the embodiment.

Hereinbefore, although the present invention is described with the embodiment, the present invention is not limited to the above-described embodiment, and various modifications may be made. For example, although the case is explained where the perpendicular magnetic write head according to the embodiment of the present invention is applied to the composite head, it is not always limited to this. The perpendicular magnetic write head may be applied to a write-dedicated head including no read head portion.

What is claimed is:

1. A perpendicular magnetic write head comprising:
   a magnetic pole having an end face on an air bearing surface; and
   side shield layers each having an end face on the air bearing surface, and arranged on both sides, in a write track width direction, of the magnetic pole with a side gap in between,
   wherein the end face of the magnetic pole has a trapezoid shape in which a width at a trailing edge is larger than a width at a leading edge, and
   relationships D1<D2, D1<D3, and D3≥D2 are satisfied in the air bearing surface, where D1 is a gap length of the side gap at the trailing edge, D2 is a gap length of the side gap at the leading edge, and D3 is a gap length of the side gap at any position between the trailing edge and the leading edge.

2. The perpendicular magnetic write head according to claim 1, further comprising a trailing shield layer disposed, on a trailing side of the magnetic pole, with a trailing gap in between, and coupled to the side shield layer.

3. The perpendicular magnetic write head according to claim 2, wherein the trailing shield layer includes a portion, having saturation magnetic flux density which is higher than that of the magnetic pole, in a position being immediately adjacent to the trailing gap layer and facing at least the magnetic pole.

4. The perpendicular magnetic write head according to claim 1, further comprising a leading shield layer disposed, on a leading side of the magnetic pole, with a leading gap in between.

5. A perpendicular magnetic write head comprising:
   a magnetic pole having an end face on an air bearing surface; and
   a write shield layer having an end face on the air bearing surface, and surrounding the magnetic pole with a gap in between, on three sides, that is both sides in a write track width direction and a trailing side,
   wherein the end face of the magnetic pole has a trapezoid shape in which a width at a trailing edge is larger than a width at a leading edge, and
   relationships D1<D2, D1<D3, and D3≥D2 are satisfied in the air bearing surface, where D1 is a gap length of the side gap at the trailing edge, D2 is a gap length of the side gap at the leading edge, and D3 is a gap length of the side gap at any position between the trailing edge and the leading edge.

6. The perpendicular magnetic write head according to claim 5, wherein the write shield layer includes:
   bottom write shield layers located on both sides of the magnetic pole, and having a thickness smaller than that of the magnetic pole, the thickness getting smaller in a region away from the magnetic pole, in comparison with a region close to the magnetic pole, and
   a top write shield layer formed on the bottom write shield layers, separately from the bottom write shield layers, being located on both sides and the trailing side of the magnetic pole, and being coupled to the bottom write shield layers.

7. A perpendicular magnetic write head comprising:
   a magnetic pole having an end face on an air bearing surface; and
   a shield layer having an end face on the air bearing surface, and surrounding the magnetic pole with a gap in between, on all sides, that is both sides in a write track width direction, a trailing side, and a leading side, wherein the end face of the magnetic pole has a trapezoid shape in which a width at a trailing edge is larger than a width at a leading edge, and relationships $D1<D2$, $D1<D3$, and $D3 \geq D2$ are satisfied in the air bearing surface, where D1 is a gap length of the side gap at the trailing edge, D2 is a gap length of the side gap at the leading edge, and D3 is a gap length of the side gap at any position between the trailing edge and the leading edge.

8. The perpendicular magnetic write head according to claim 7, wherein the shield layer includes:

a write shield layer located on both sides and the trailing side of the magnetic pole, and a leading shield layer located on the leading side of the magnetic pole, away from the write shield layer, or coupled to the write shield layer.

9. A magnetic write device comprising a recording medium and a perpendicular magnetic write head, the perpendicular magnetic write head including:

a magnetic pole having an end face on an air bearing surface, and a couple of side shield layers each having an end face on the air bearing surface, and arranged on both sides, in a write track width direction, of the magnetic pole with a side gap in between, wherein the end face of the magnetic pole has a trapezoid shape in which a width at a trailing edge is larger than a width at a leading edge, and relationships $D1<D2$, $D1<D3$, and $D3 \geq D2$ are satisfied in the air bearing surface, where D1 is a gap length of the side gap at the trailing edge, D2 is a gap length of the side gap at the leading edge, and D3 is a gap length of the side gap at any position between the trailing edge and the leading edge.

10. The perpendicular magnetic write head according to claim 1, wherein $D3>D2$.

11. The perpendicular magnetic write head according to claim 5, wherein $D3>D2$.

12. The perpendicular magnetic write head according to claim 7, wherein $D3>D2$.

13. The magnetic write device comprising a recording medium and the perpendicular magnetic write head according to claim 9, wherein $D3>D2$.

14. The perpendicular magnetic write head according to claim 1, wherein side edges of the magnetic pole, each side edge connecting the trailing edge to the leading edge, are formed as a single straight edge.

15. The perpendicular magnetic write head according to claim 5, wherein side edges of the magnetic pole, each side edge connecting the trailing edge to the leading edge, are formed as a single straight edge.

16. The perpendicular magnetic write head according to claim 7, wherein side edges of the magnetic pole, each side edge connecting the trailing edge to the leading edge, are formed as a single straight edge.

17. The magnetic write device comprising a recording medium and the perpendicular magnetic write head according to claim 9, wherein side edges of the magnetic pole, each side edge connecting the trailing edge to the leading edge, are formed as a single straight edge.

* * * * *